United States Patent
Lee et al.

(10) Patent No.: US 9,252,877 B1
(45) Date of Patent: Feb. 2, 2016

(54) VOICE COMMUNICATION UNIT

(71) Applicants: Joseph C. Lee, Riverside, CA (US);
Timothy Lee, Riverside, CA (US)

(72) Inventors: Joseph C. Lee, Riverside, CA (US);
Timothy Lee, Riverside, CA (US)

( * ) Notice: Subject to any disclaimer, the term of this patent is extended or adjusted under 35 U.S.C. 154(b) by 0 days.

(21) Appl. No.: 14/478,941

(22) Filed: Sep. 5, 2014

(51) Int. Cl.
| | |
|---|---|
| *H04B 10/114* | (2013.01) |
| *H04M 1/247* | (2006.01) |
| *H04L 5/14* | (2006.01) |
| *H04R 23/00* | (2006.01) |

(52) U.S. Cl.
CPC .............. *H04B 10/1143* (2013.01); *H04L 5/14* (2013.01); *H04M 1/2475* (2013.01); *H04R 23/008* (2013.01)

(58) Field of Classification Search
CPC ................. H04R 23/008; H04B 10/11–10/116
See application file for complete search history.

(56) References Cited

U.S. PATENT DOCUMENTS

| | | | | |
|---|---|---|---|---|
| 5,907,418 A * | 5/1999 | Walczak | ............ | H04B 10/1143 340/7.54 |
| 2004/0052391 A1* | 3/2004 | Bren | ...................... | H04R 25/43 381/331 |
| 2004/0066326 A1* | 4/2004 | Knapp | ................. | H01Q 1/1285 342/350 |

* cited by examiner

*Primary Examiner* — David Payne
*Assistant Examiner* — Casey Kretzer
(74) *Attorney, Agent, or Firm* — John K. Park; Park Law Firm

(57) ABSTRACT

A voice communication unit for communicating through a barrier is provided, enabling handicapped persons to use the device, and comprising an outer audio unit, an inner audio unit, an outer audio frequency modulation loop, and an infrared audio frequency transmitter. The outer audio unit comprises an outer voice sensing device configured for sensing voice at an outer side and generating voice signals for an inner side and an outer voice reproducing device configured for reproducing voice at the outer side from voice signal from the inner side. The outer audio frequency modulation loop is configured for activating and delivering the voice signals to an external hearing aid device having a Telecoil. The infrared audio frequency transmitter is configured for activating and delivering the voice signals to an external hearing aid device having an infrared detector.

12 Claims, 31 Drawing Sheets

Section A

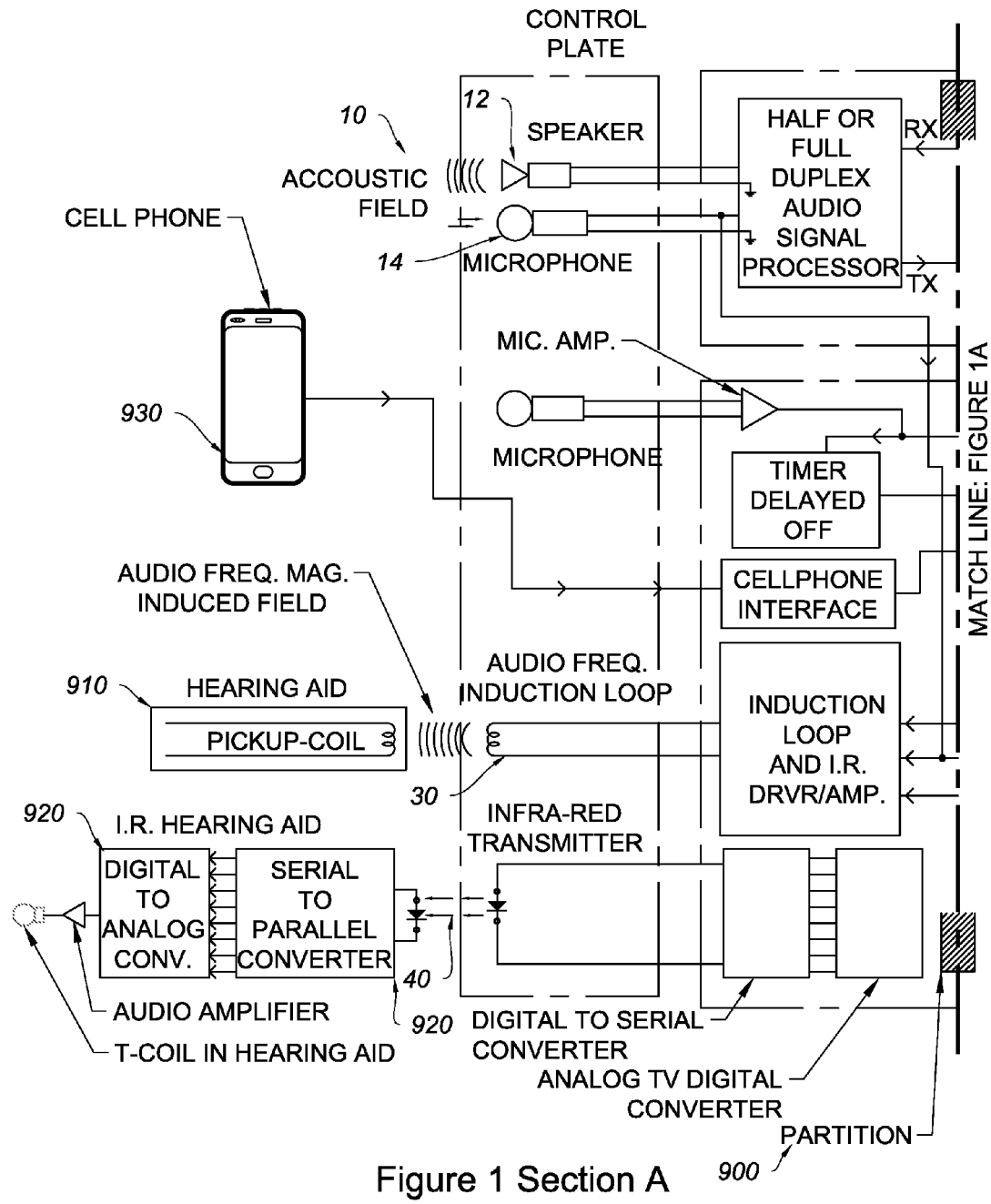
Figure 1 Section A

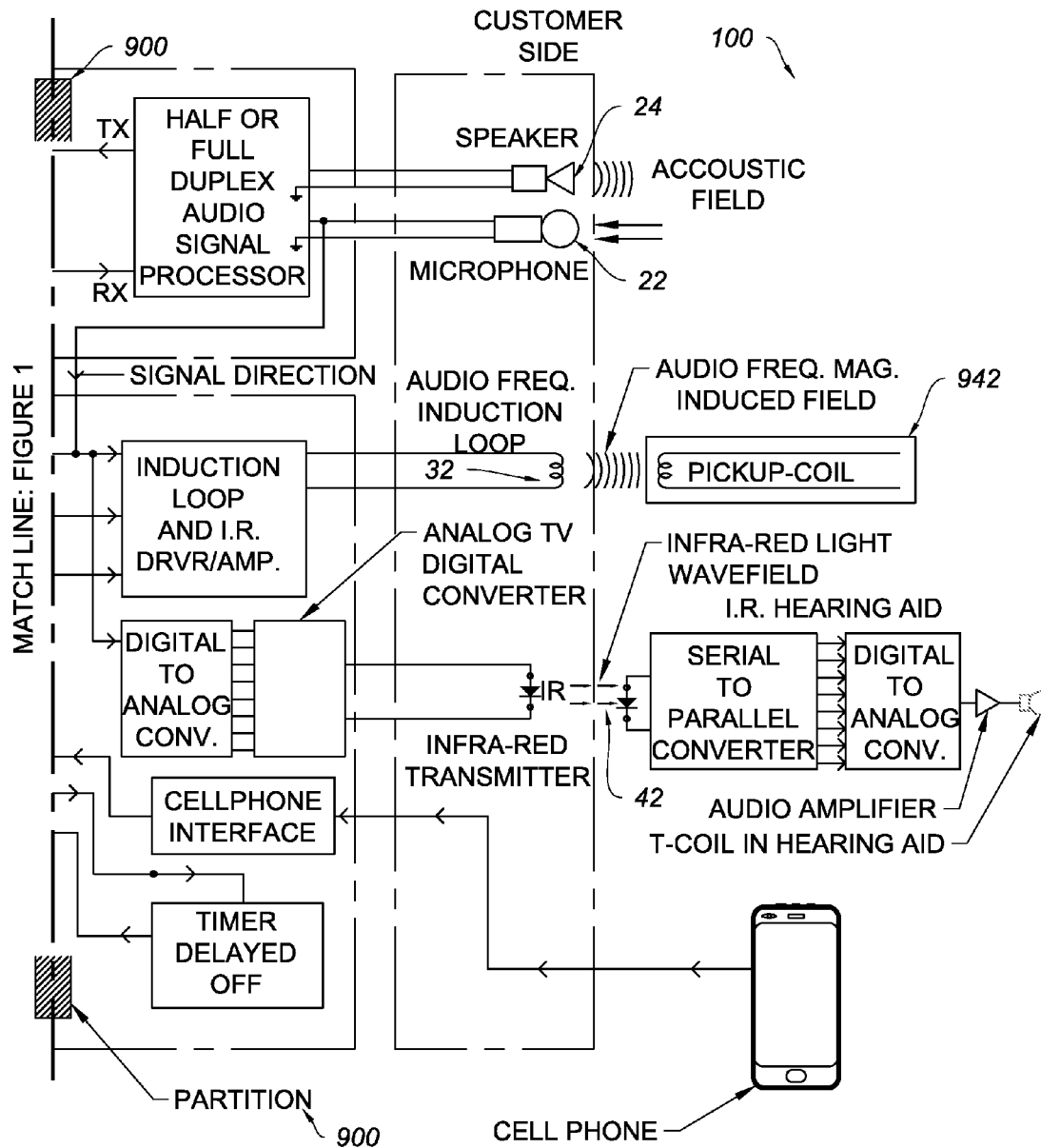
Figure 1 Section B

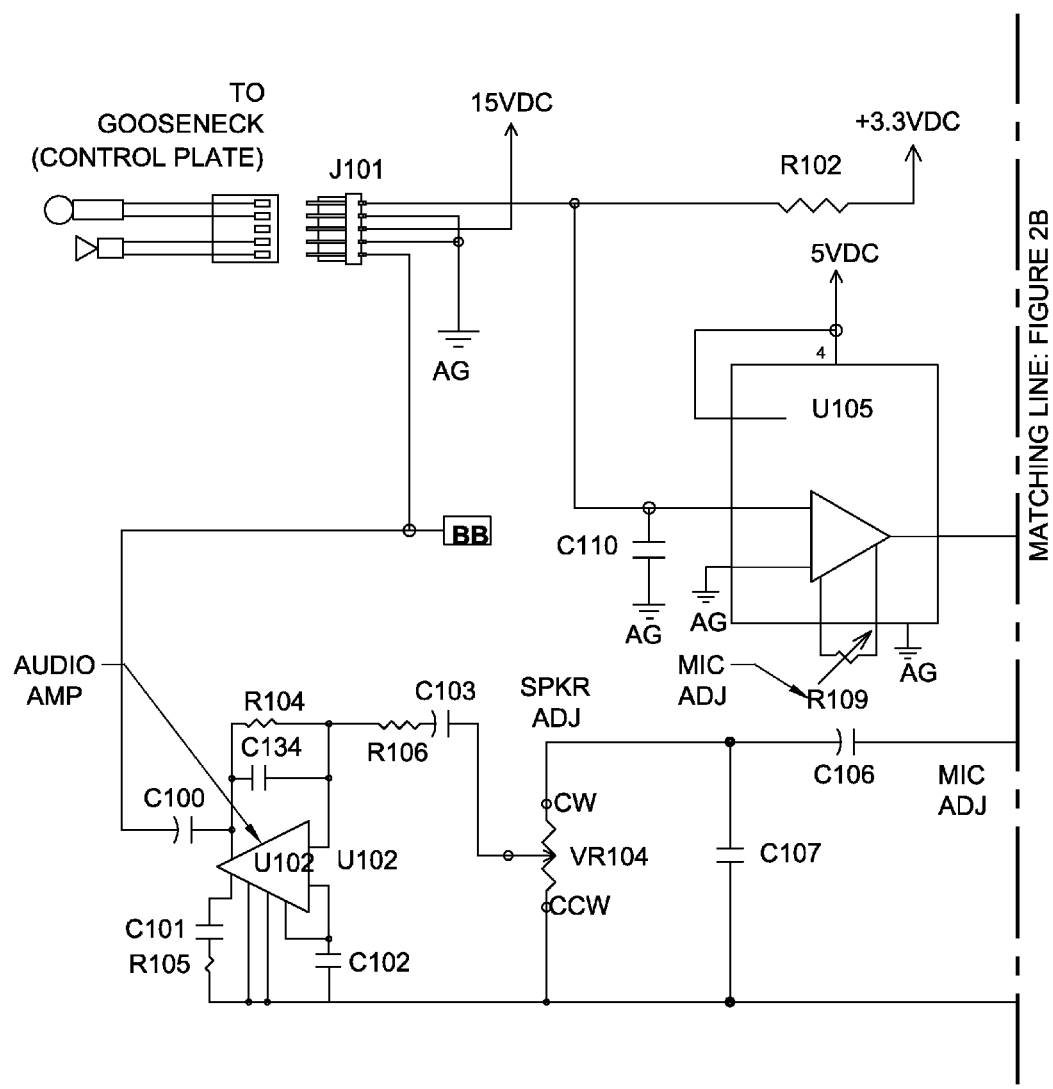
Figure 10 Section A

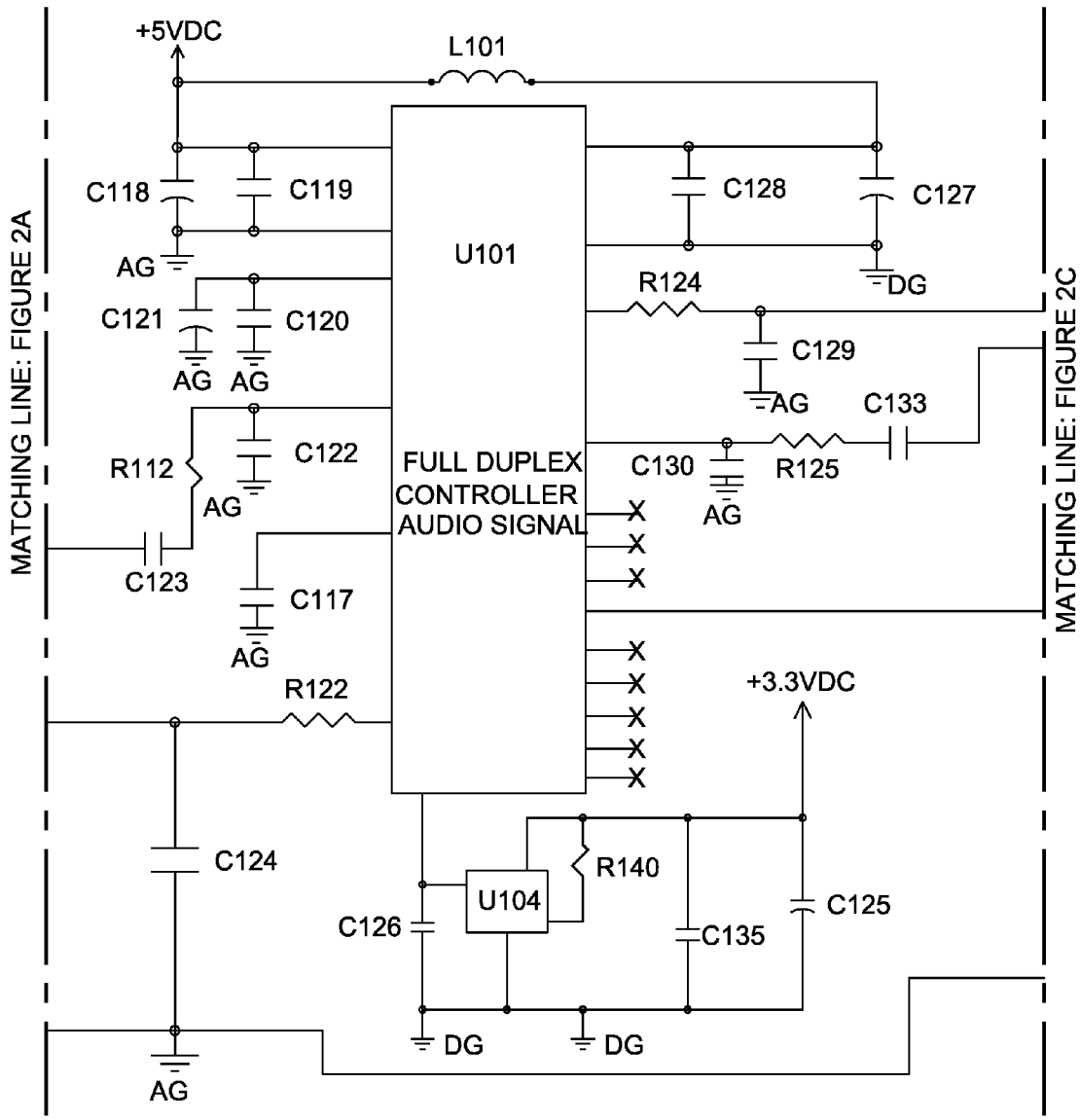
Figure 10 Section B

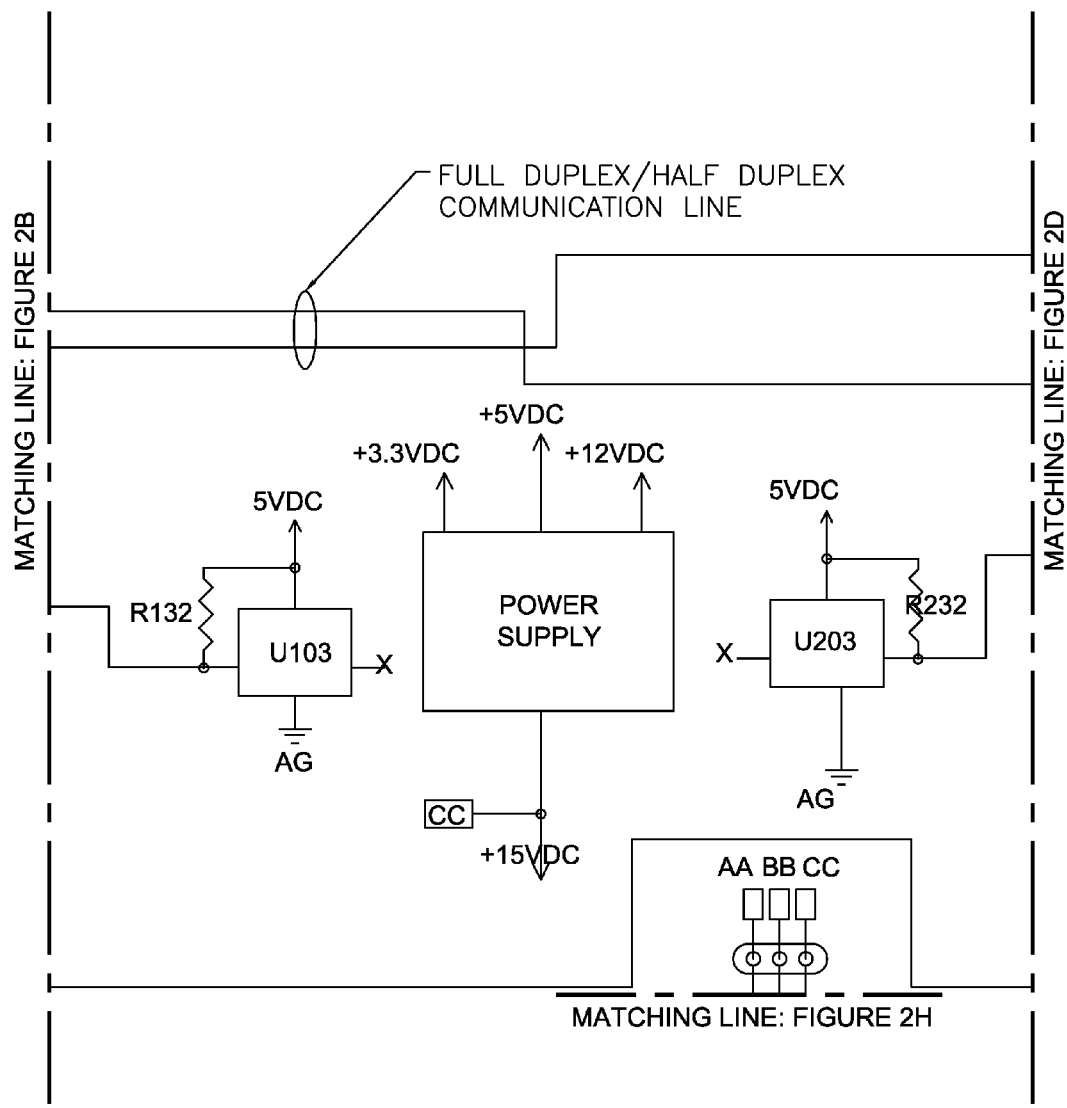
Figure 10 Section C

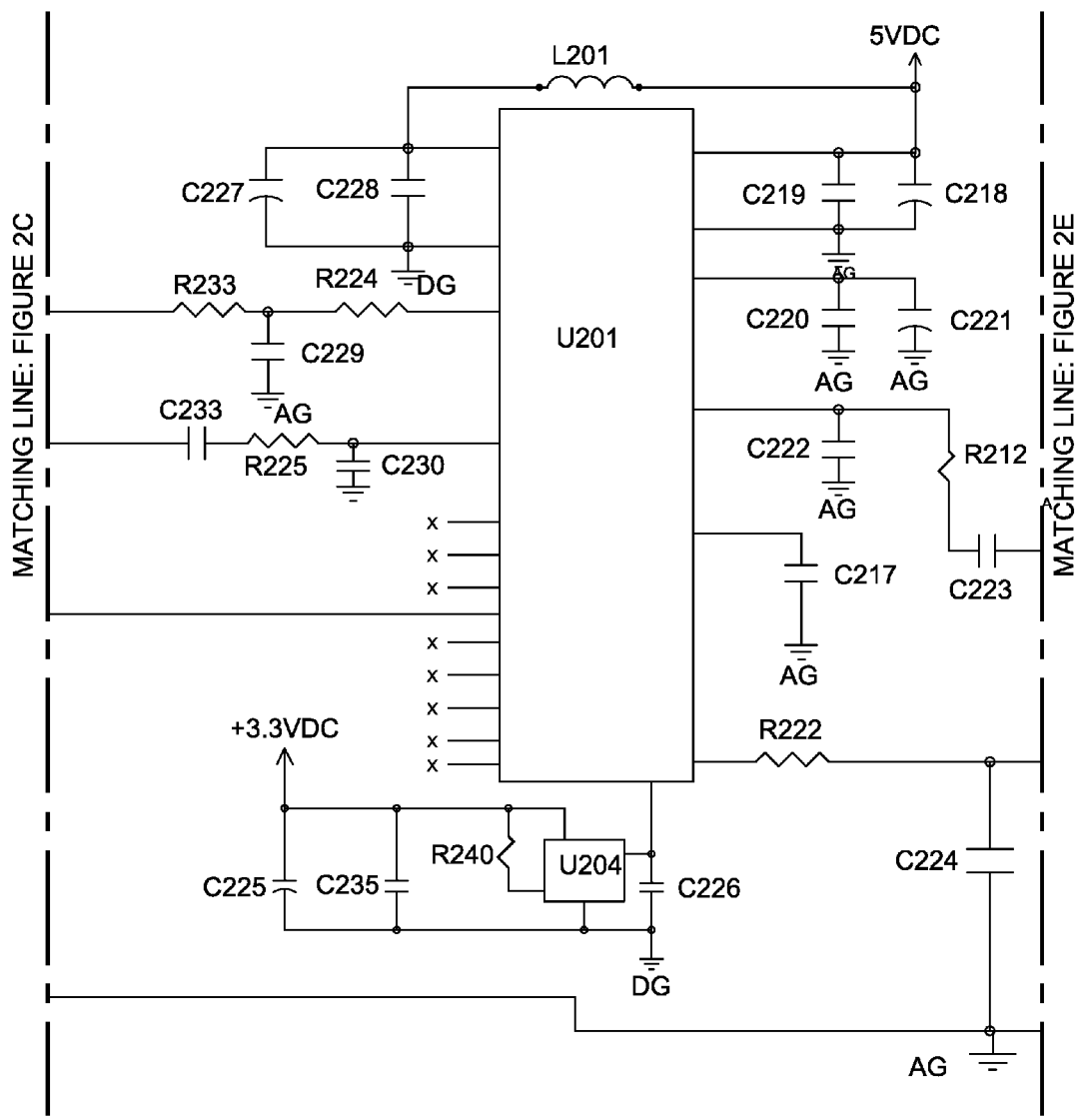
Figure 10 Section D

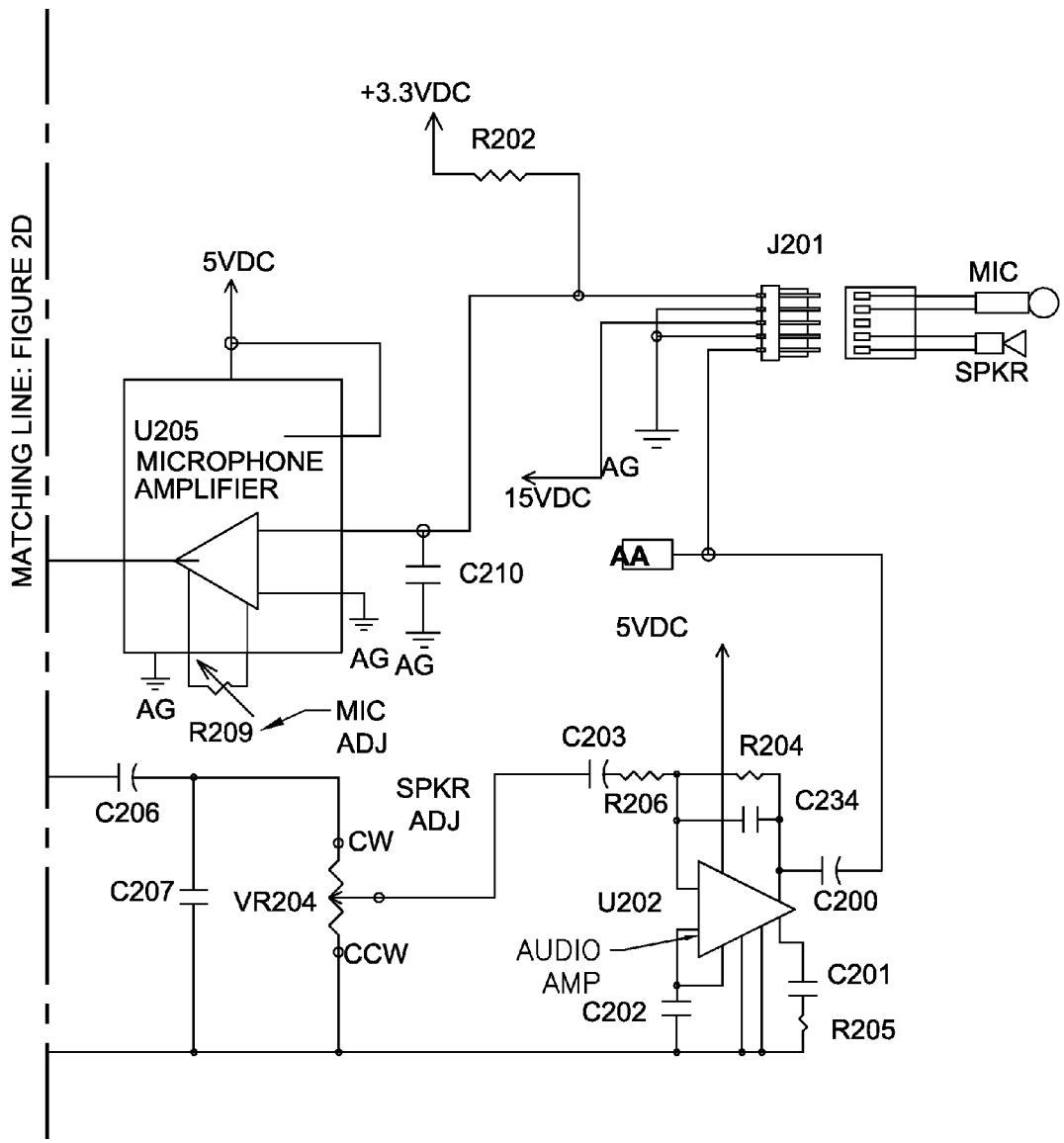
Figure 10 Section E

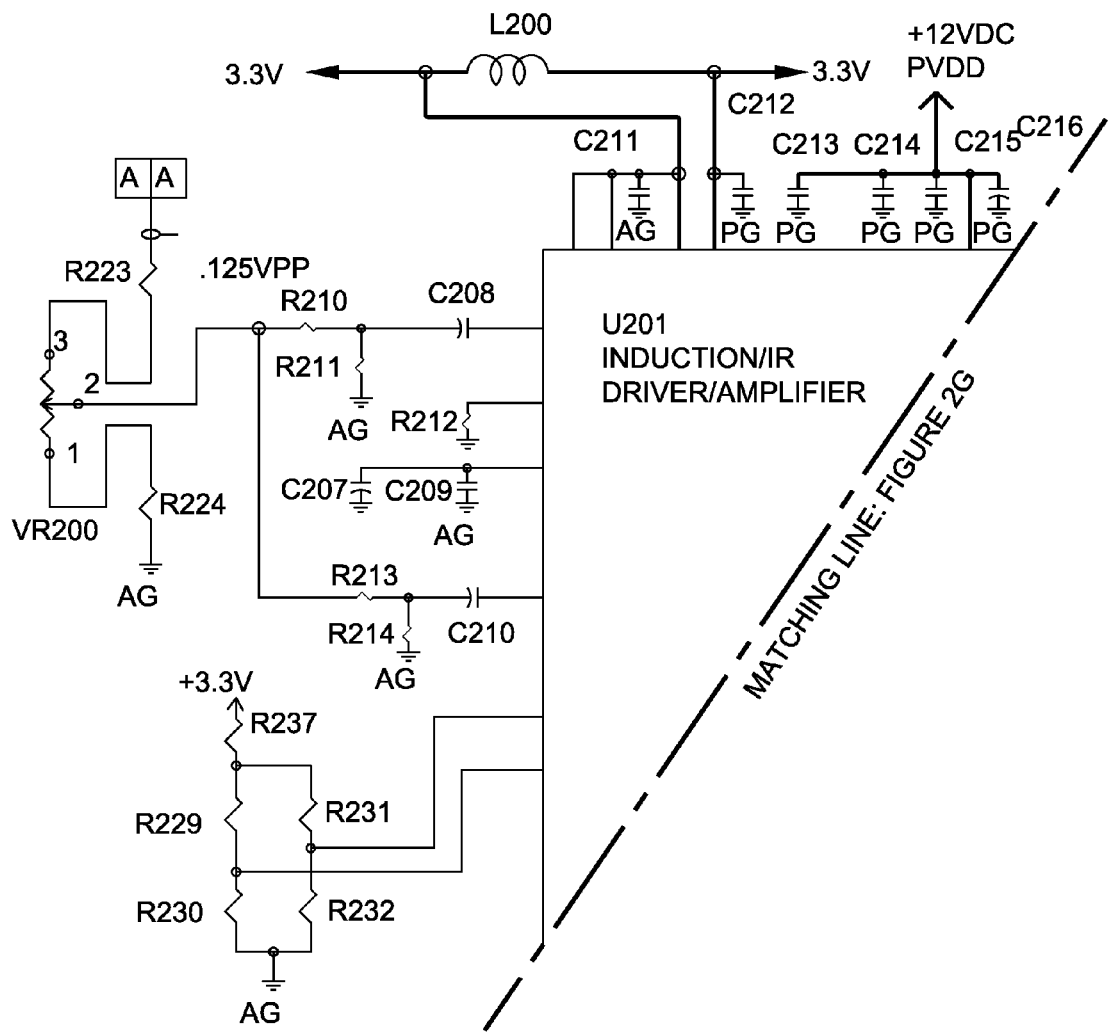
Figure 10 Section F

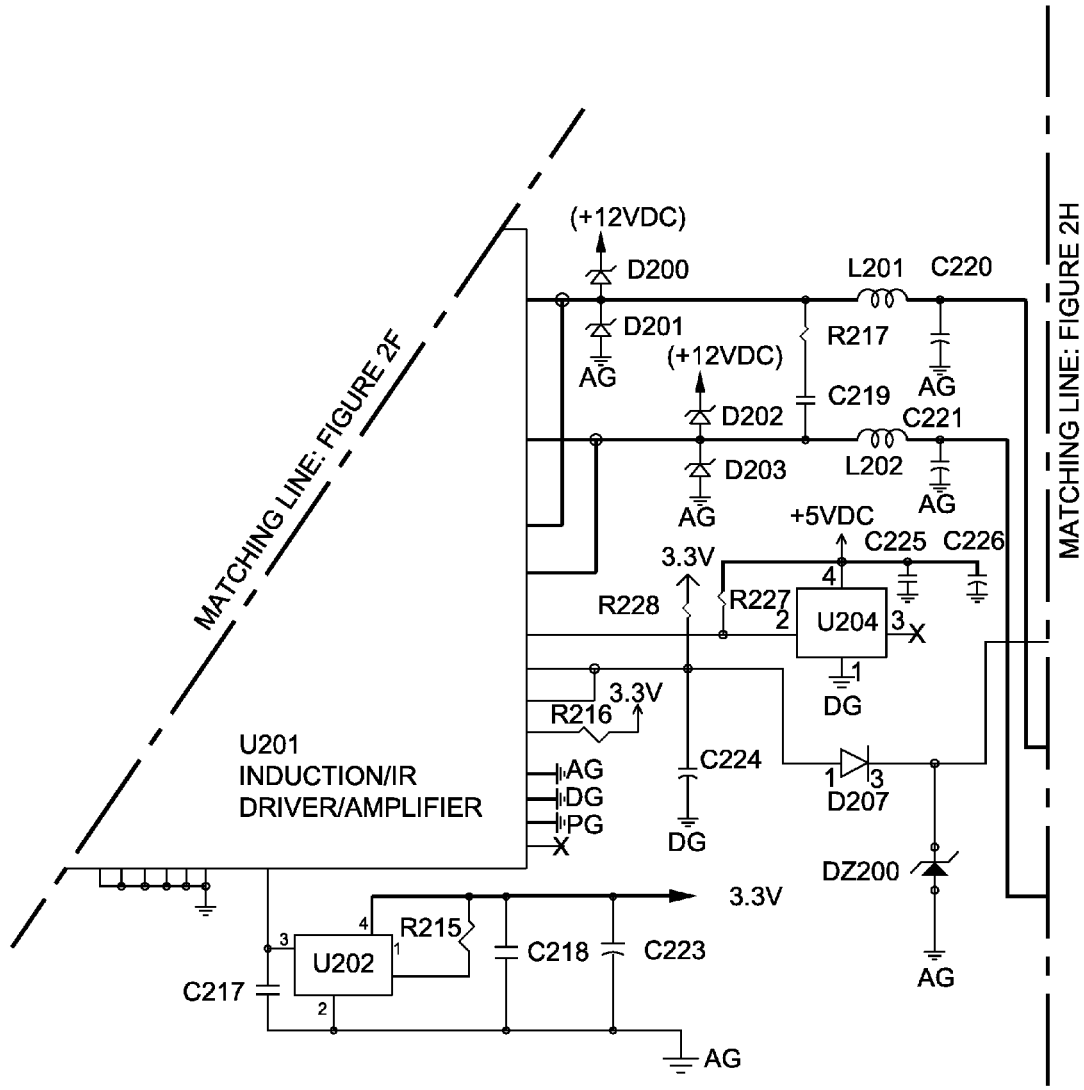
Figure 10 Section G

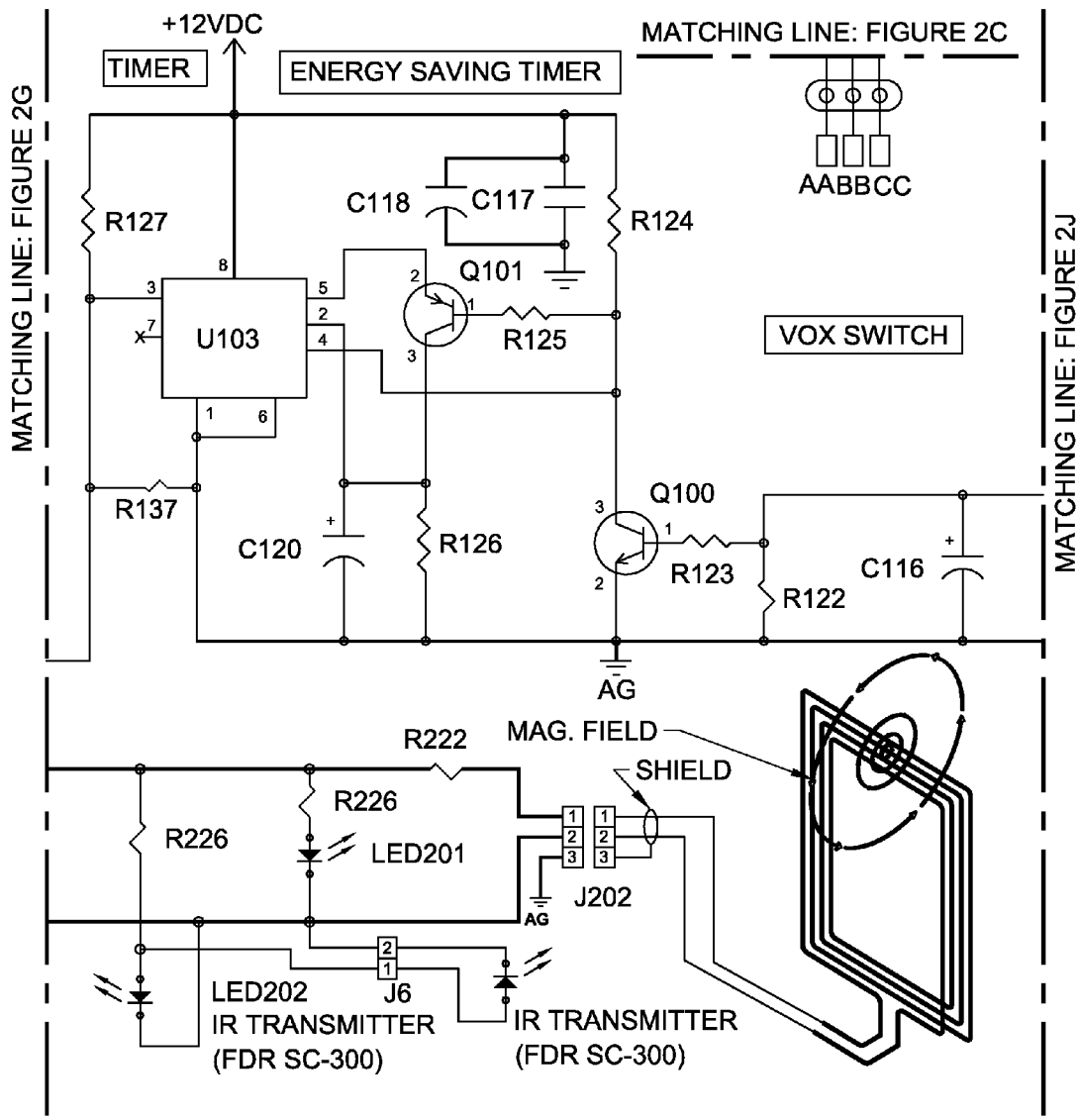
Figure 10 Section H

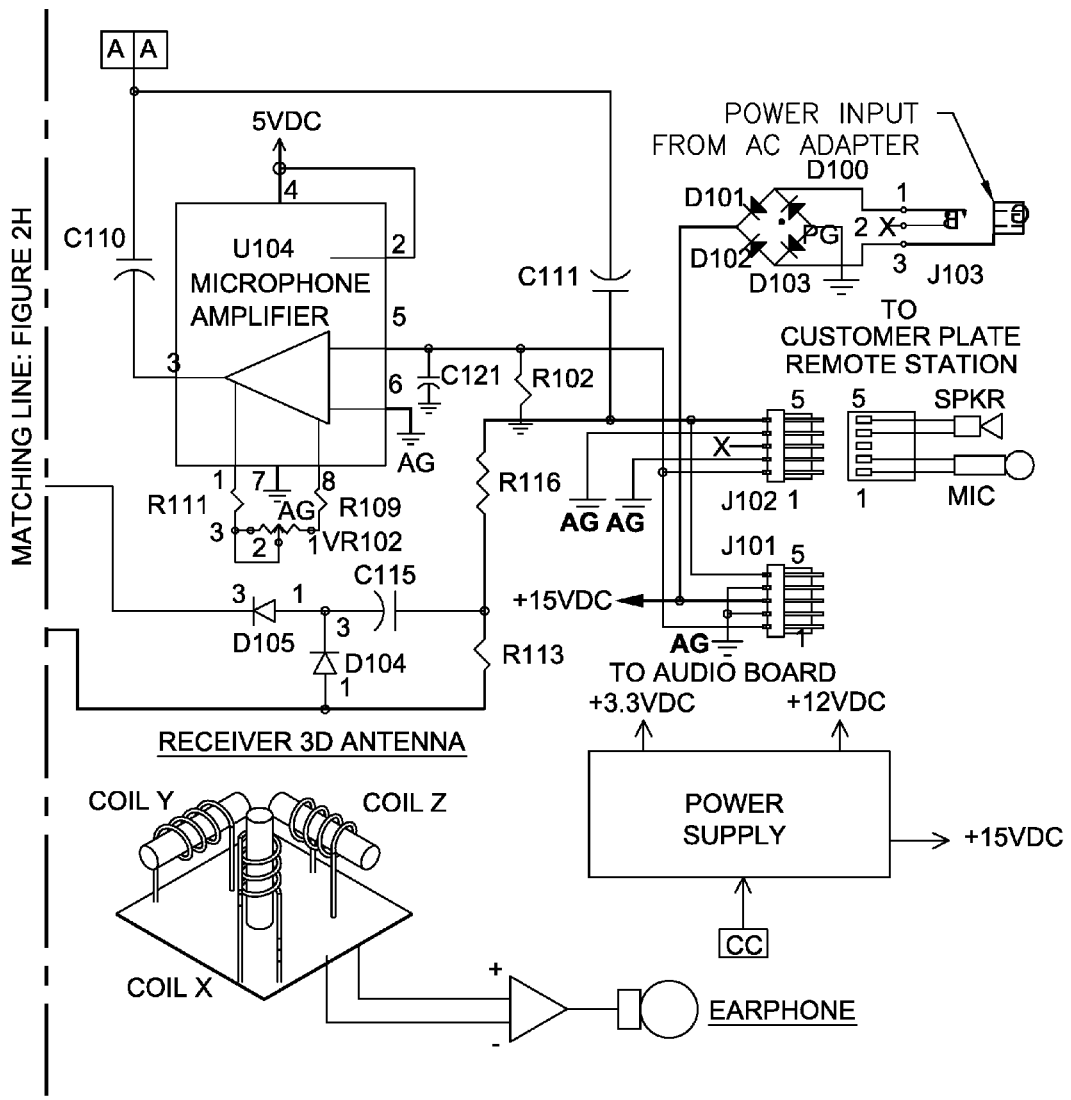
Figure 10 Section I

VOICE COMMUNICATION UNIT

BACKGROUND OF THE INVENTION

The present invention relates to a voice communication unit for communicating over a barrier.

A need for a voice communication unit has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a voice communication unit.

Another object of the invention is to provide a voice communication unit for communicating through a barrier.

Still another object of the invention is to provide a voice communication unit for communicating through a barrier, which is weatherproof.

An aspect of the invention provides a voice communication unit for communicating through a barrier, which enables handicapped persons to use the device.

The voice communication unit for communicating through a barrier comprises an outer audio unit, an inner audio unit, an outer audio frequency modulation loop, and an infrared audio frequency transmitter.

The outer audio unit comprises an outer voice sensing device configured for sensing voice at an outer side and generating voice signals for an inner side and an outer voice reproducing device configured for reproducing voice at the outer side from voice signal from the inner side.

The inner audio unit comprises an inner voice sensing device configured for sensing voice at the inner side and generating voice signals for the outer side and an inner voice reproducing device configured for reproducing voice at the inner side from voice signal from the outer side.

The outer audio frequency modulation loop is configured for activating and delivering the voice signals to an external hearing aid device having a Telecoil.

The infrared audio frequency transmitter is configured for activating and delivering the voice signals to an external hearing aid device having an infrared detector.

The voice communication unit is configured for providing a full-duplex hands-free communication over the barrier through an adaptive digital filter.

The outer audio frequency modulation loop is disposed in a cylindrical housing and comprises first, second, third induction loops.

The first induction loop is provided on a front end portion the cylindrical housing enclosing the outer voice reproducing device disposed in a central portion of the front end portion of the cylindrical housing, and coils of the first induction loop are wound perpendicularly with respect to an axis of the cylindrical housing.

The second induction loop is provided around a side circumferential surface portion of the cylindrical housing, and coils of the second induction loop are wound in parallel with respect to an axis of the cylindrical housing.

The third induction loop is provided on a base plate from which the cylindrical housing protrudes, and coils of the third induction loop are wound perpendicularly with respect to an axis of the cylindrical housing.

Each of the first, second, and third induction loops is configured to receive audio signals from the inner voice sensing device and generate audio-frequency-induced electro-magnetic field.

The audio-frequency-induced electro-magnetic field is adapted to be picked up by the external hearing aid device having a Telecoil.

The outer audio frequency modulation loop may further comprise an induction loop driver connected between the first, second, and third induction loops and configured for driving the audio signals from the inner voice sensing device so as to generate the audio-frequency-induced electro-magnetic field.

The diameters of the first, second, and third induction loops may be different from one another.

The infrared audio frequency transmitter may be disposed on the front end portion of the cylindrical housing.

The outer voice reproducing device may be receded inward so as to avoid effects from external weather conditions.

The outer audio frequency modulation loop may be further configured for activating and delivering the voice signals to a mobile communicating device having a wireless communication capability using short-wavelength UHF radio waves.

The mobile communication may comprise a smart phone. The mobile communication may comprise iPhone®. The wireless communication capability using short-wavelength UHF radio waves may comprise Bluetooth®.

At least one of the first induction loop, the second induction loop, and the third induction loop may be configured for activating and delivering the voice signals to the mobile communicating device.

The voice communication unit may further comprise an interfacing device for providing an interface to a mobile communication device that works as the external hearing aid device. The mobile communication device may comprise a cellular phone or a smart phone.

The advantages of the present invention are: (1) the voice communication unit for communicating through a barrier according to the invention is weatherproof; and (2) the voice communication unit conforms to "The Americans with Disabilities Act (A.D.A.).

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 1 is a schematic diagram showing a voice communication unit according to an embodiment of the present invention;

FIGS. 7*a*-1, 7*a*-2, 7*b*-1, and 7*b*-2 are a circuit diagram for a perspective view of three planes induction loops for a voice communication unit according to an embodiment of the present invention;

FIGS. 8*a*-1, 8*a*-2, 8*b*-1, and 8*b*-2 are a circuit diagram for a perspective view of three planes induction loops for a voice communication unit according to another embodiment of the present invention;

FIG. 9(*b*) is a block diagram showing an interface of a cell phone and a voice communication unit according to another embodiment of the present invention;

FIG. 10 is a schematic diagram showing a voice communication unit according to another embodiment of the present invention;

DETAILED DESCRIPTION EMBODIMENTS OF THE INVENTION

Figure 2:
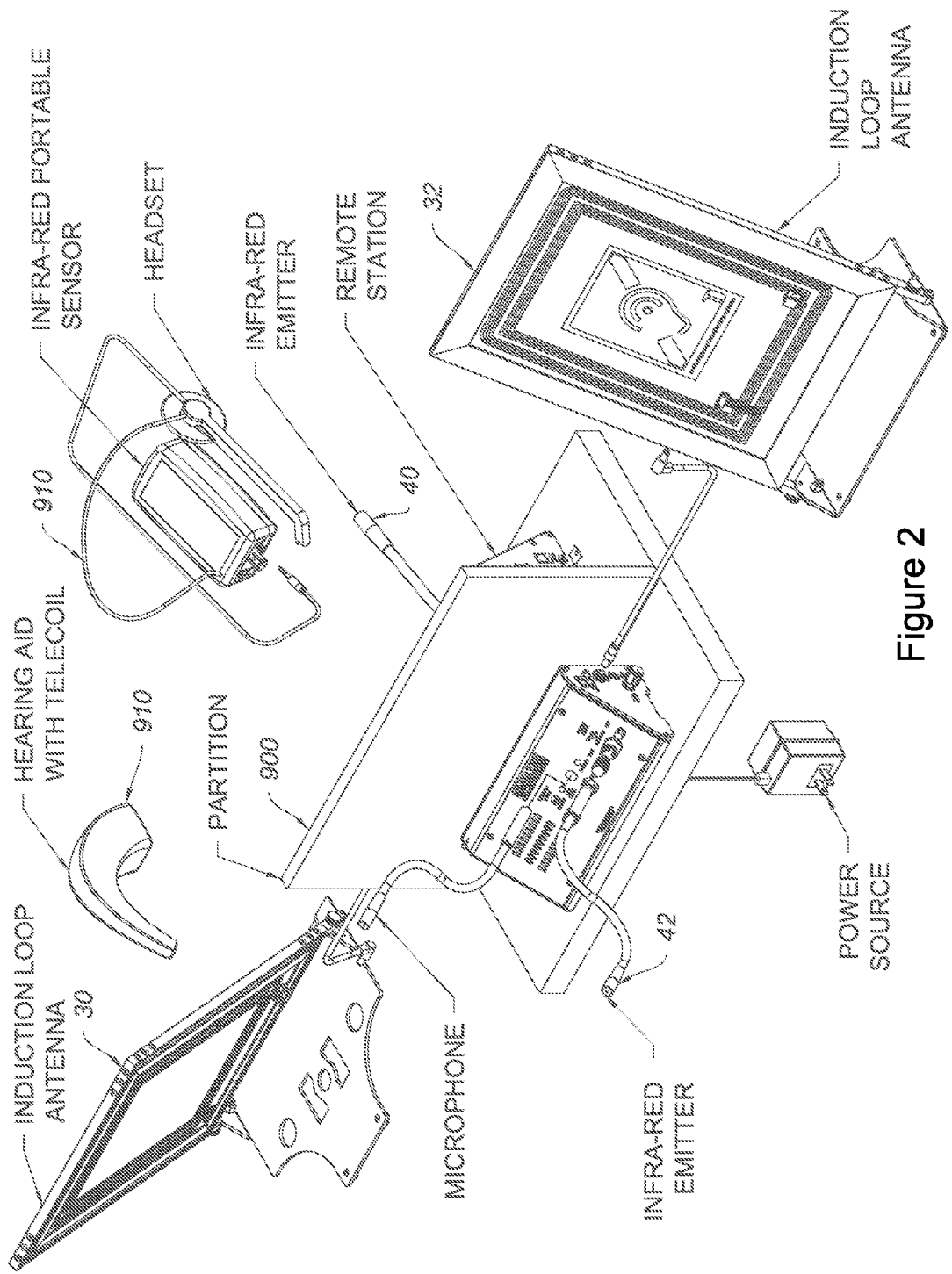
FIG. 2 is a perspective view showing a voice communication unit according to an embodiment of the present invention.

FIGS. 1-8 show a voice communication unit according to an embodiment of the present invention. And, FIGS. 9-16 show a voice communication unit according to another embodiment of the present invention.

As shown in the drawings, an aspect of the invention provides a voice communication unit 100 for communicating through a barrier 900, which enables handicapped persons to use the voice communication unit 100 along with his own aiding devices.

The voice communication unit 100 for communicating through a barrier 900 comprises an outer audio unit 10, an inner audio unit 20, an outer audio frequency modulation loop 30, and an infrared audio frequency transmitter 40.

Figures 1, 7A:
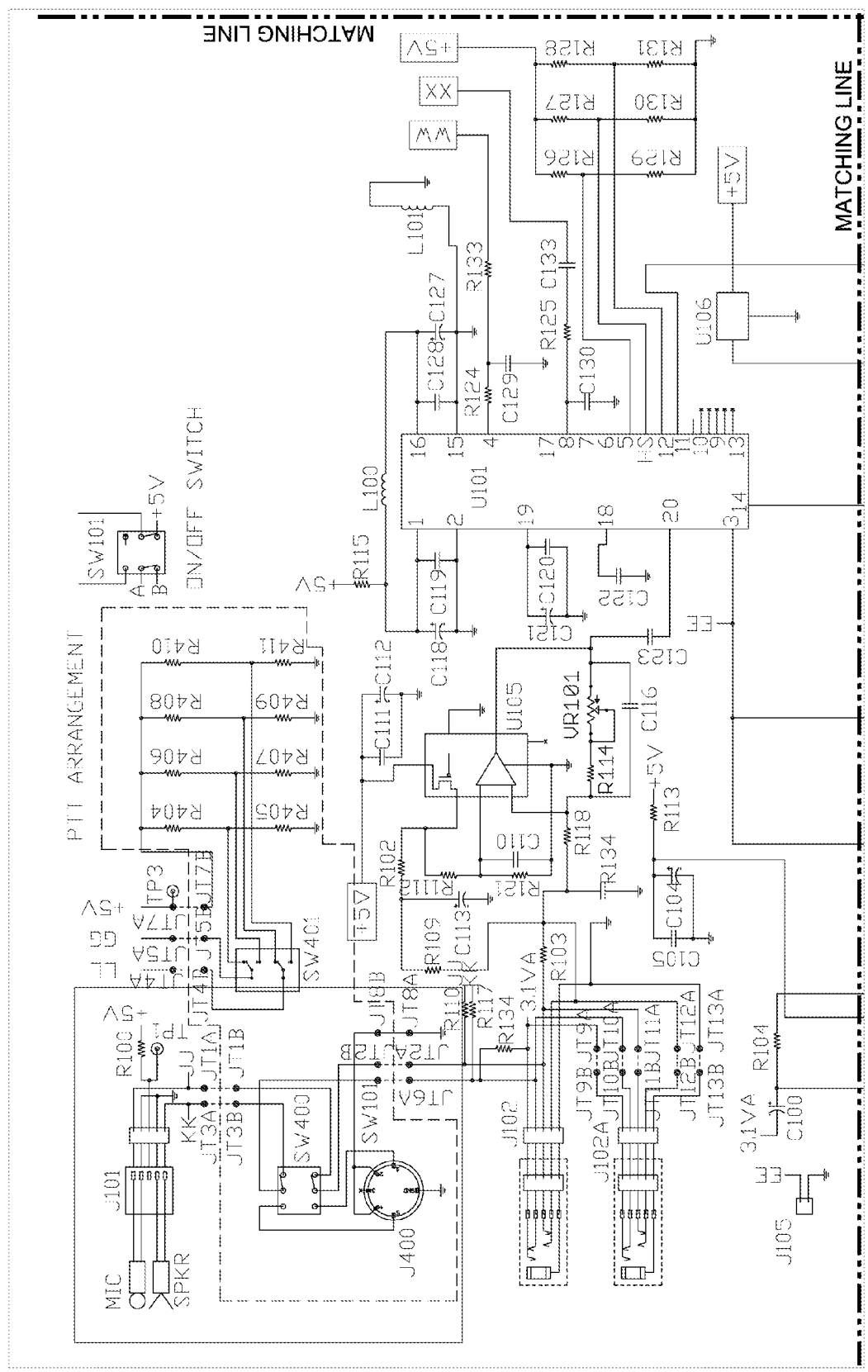
Figures 2, 7A:
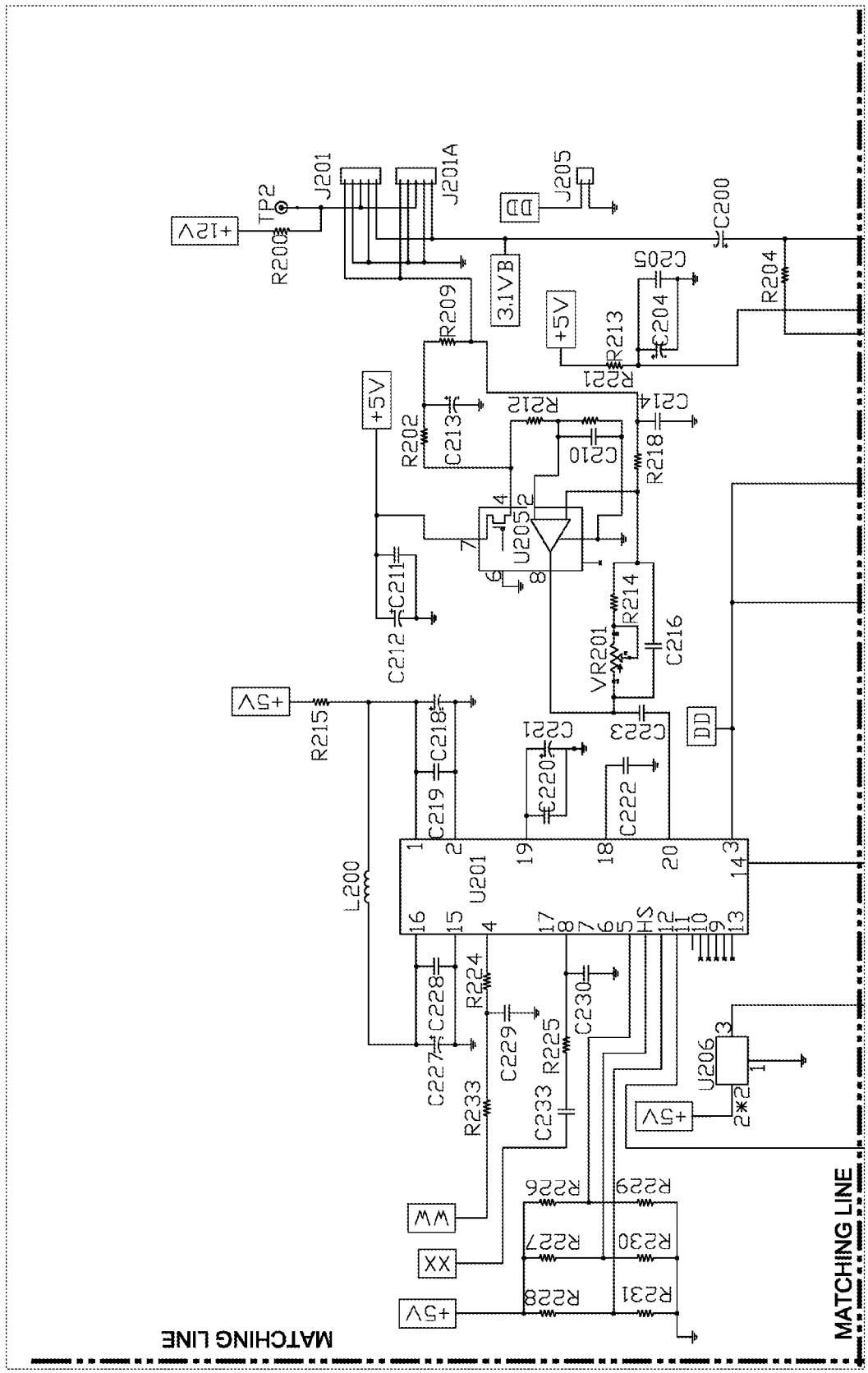
Figures 1, 7B:
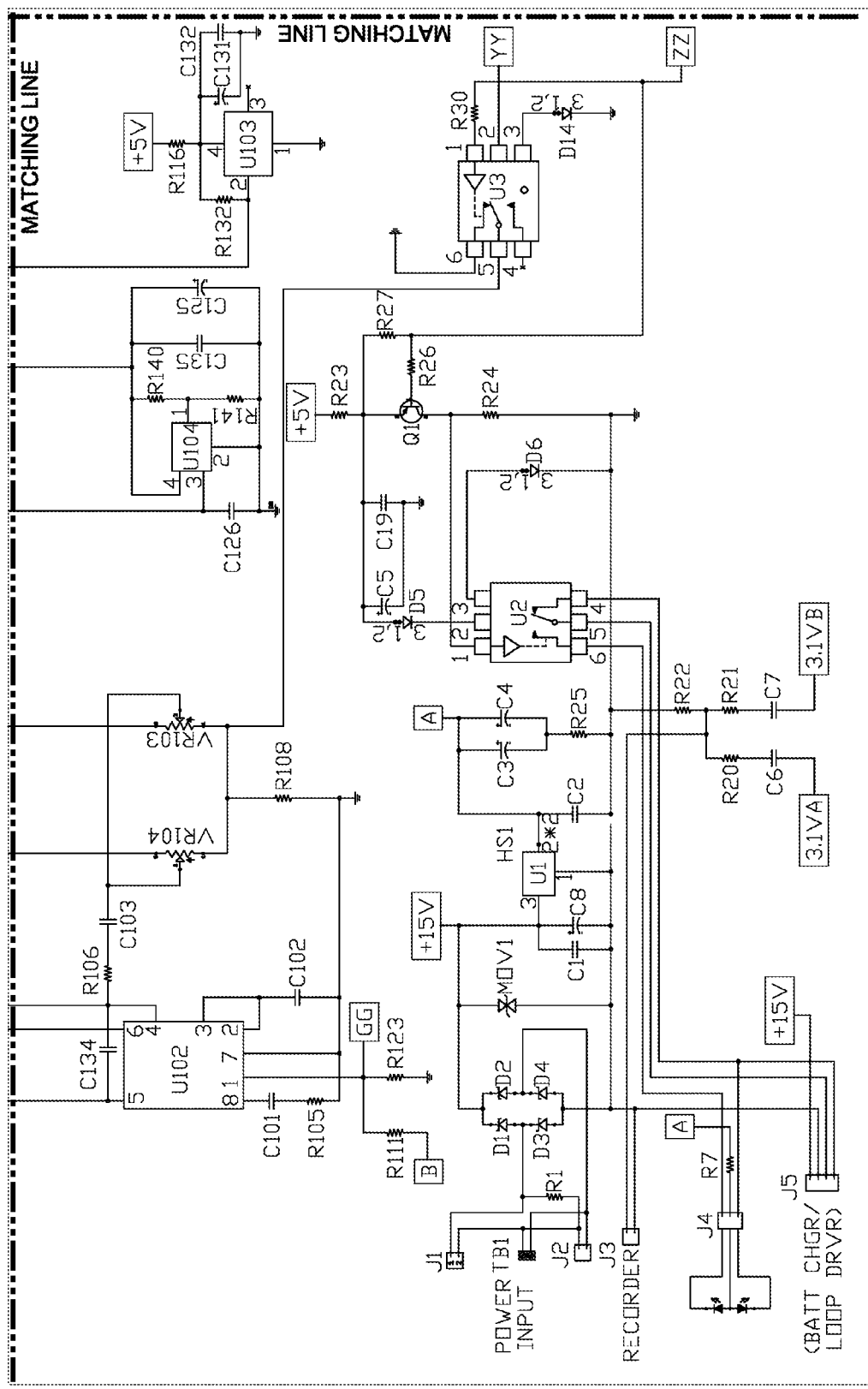
Figures 2, 7B:
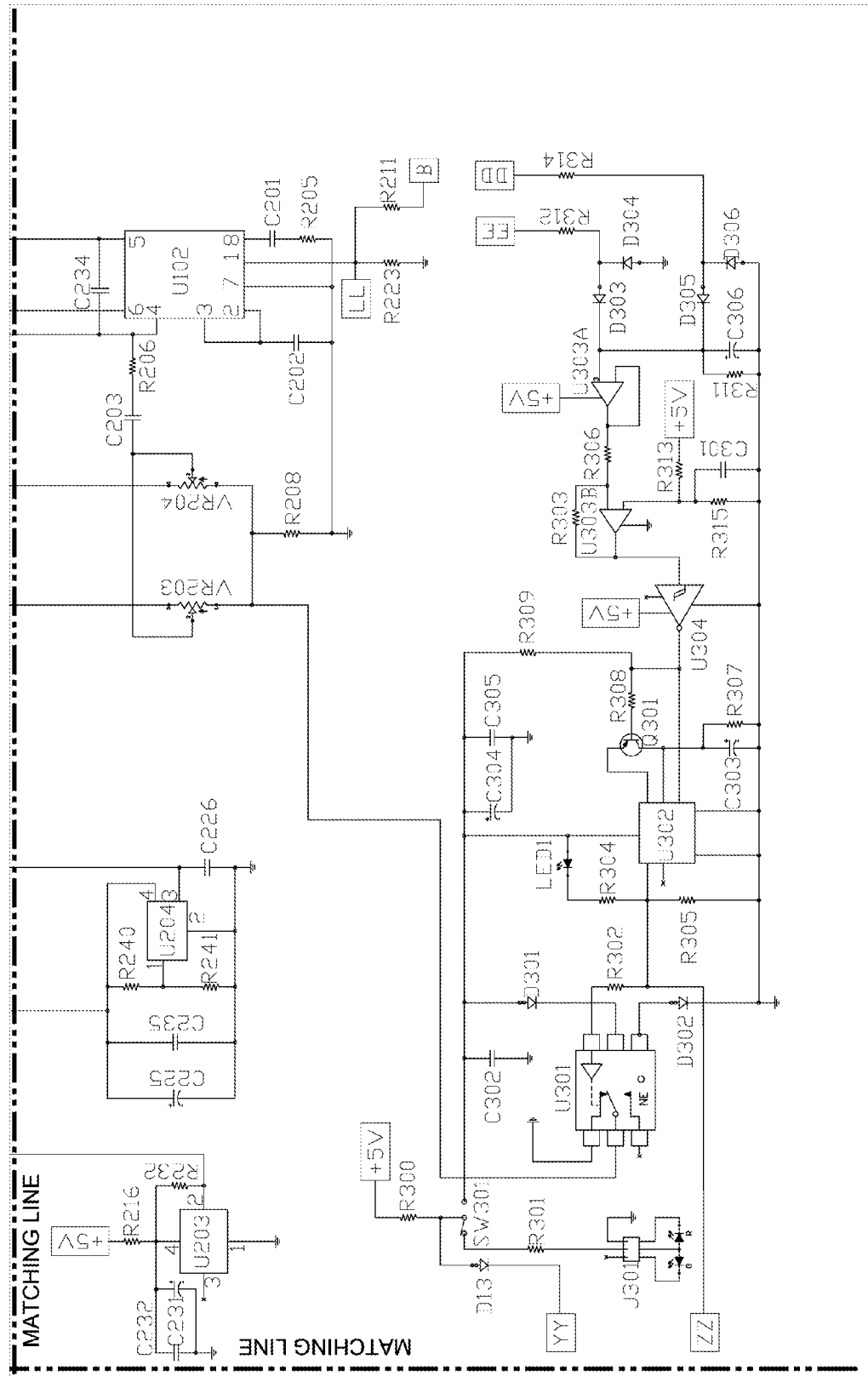
Figures 1, 8A:
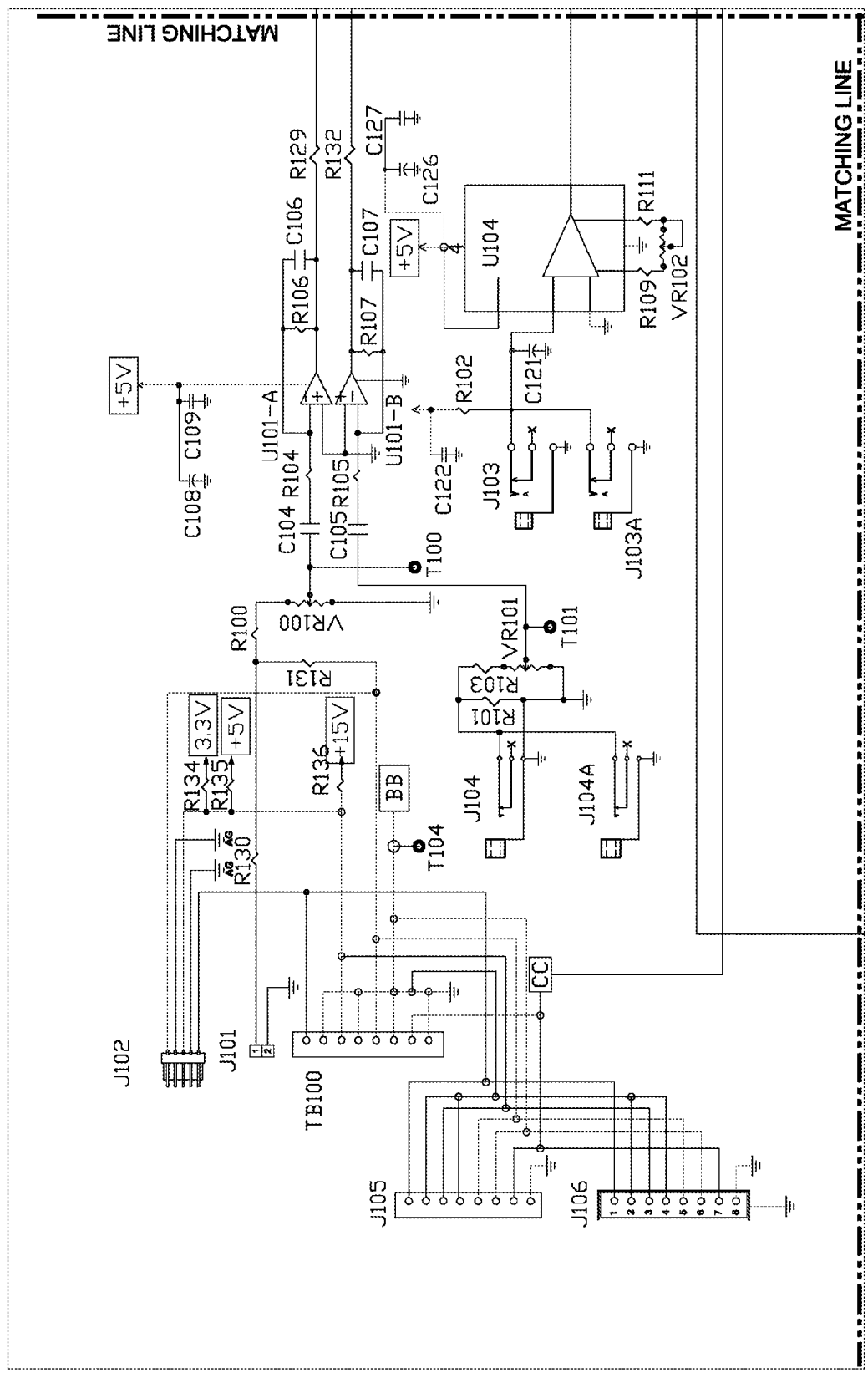
Figures 2, 8A:
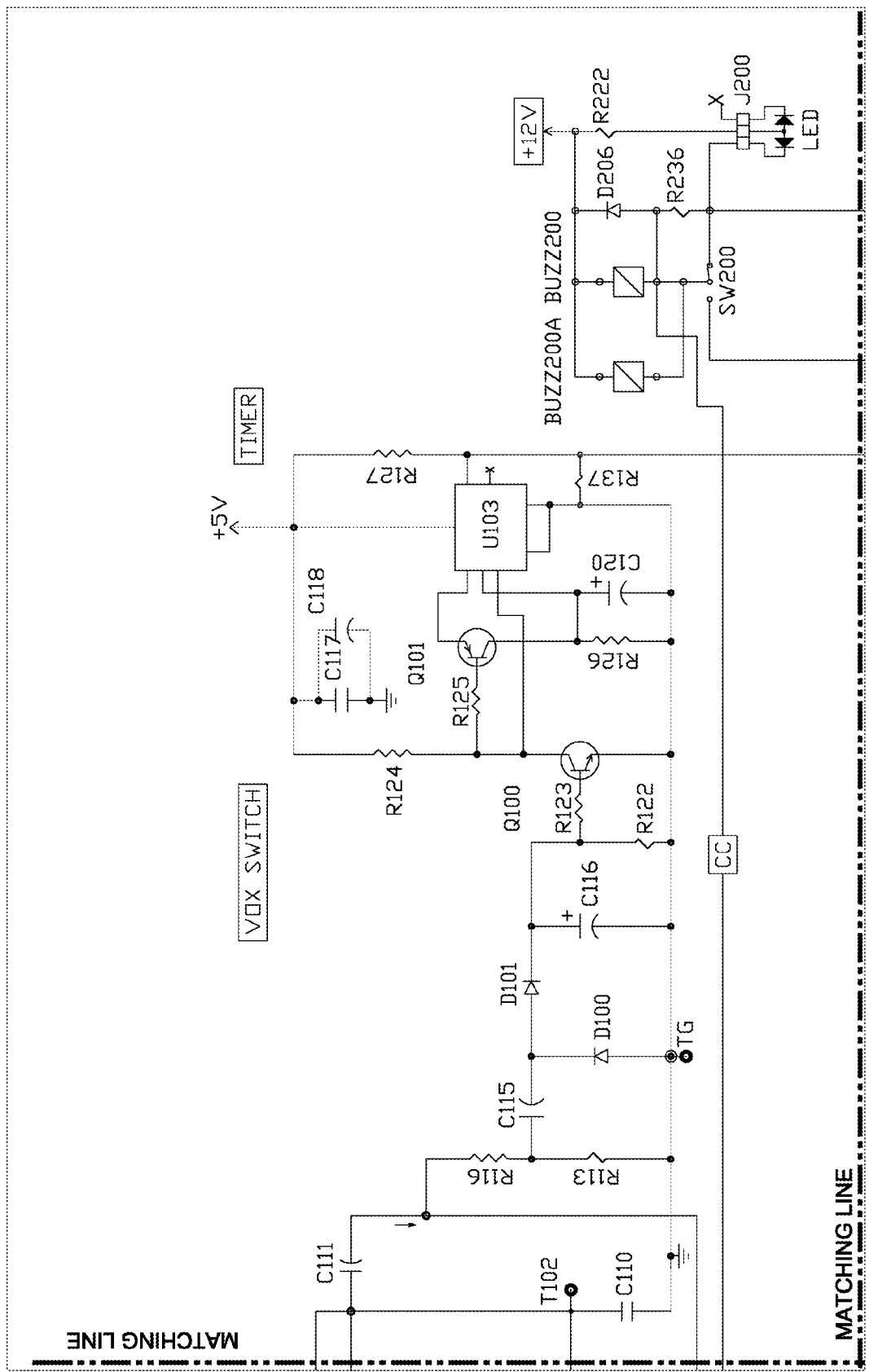
Figures 1, 8B:
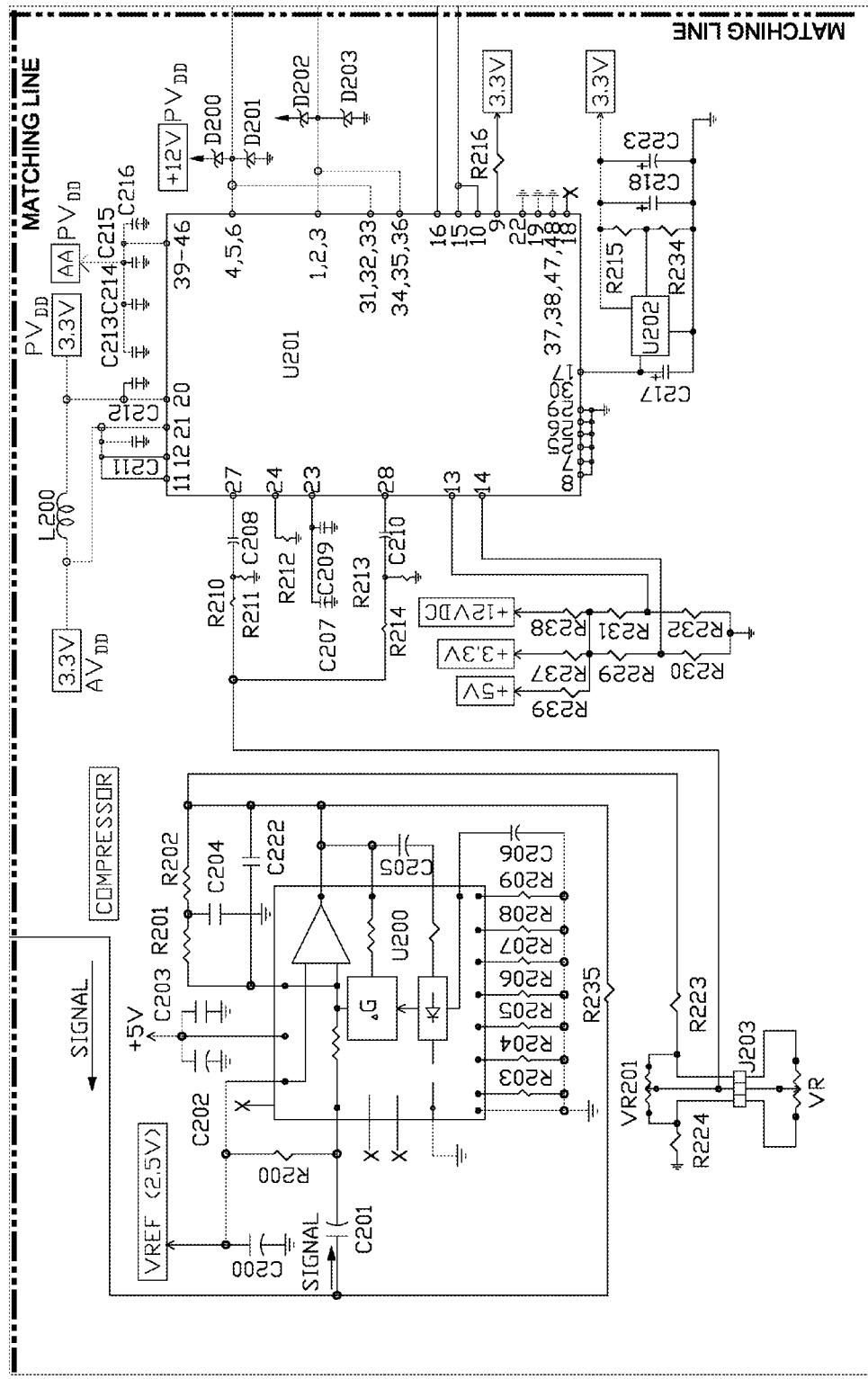
Figures 2, 8B:
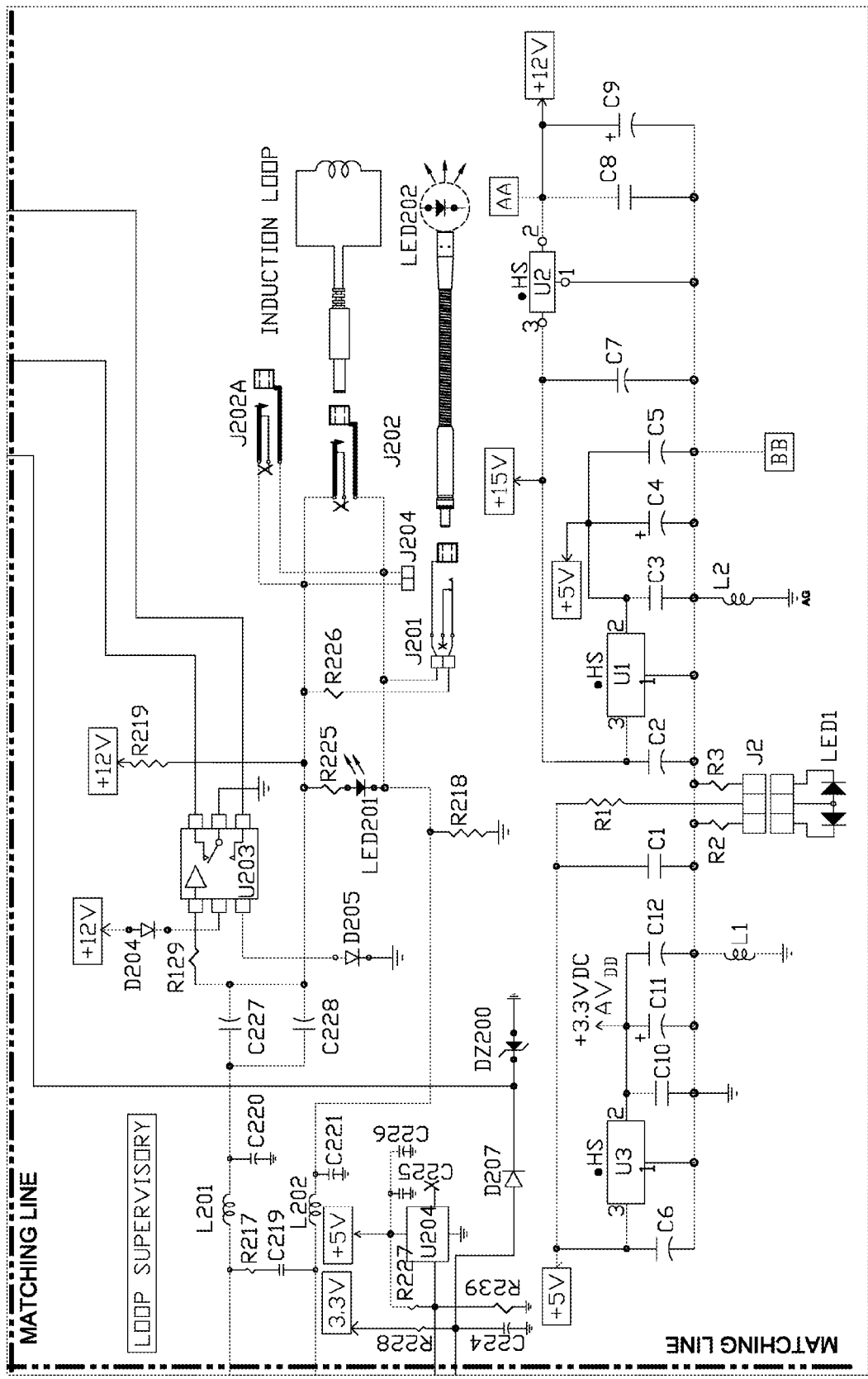
Figure 9:
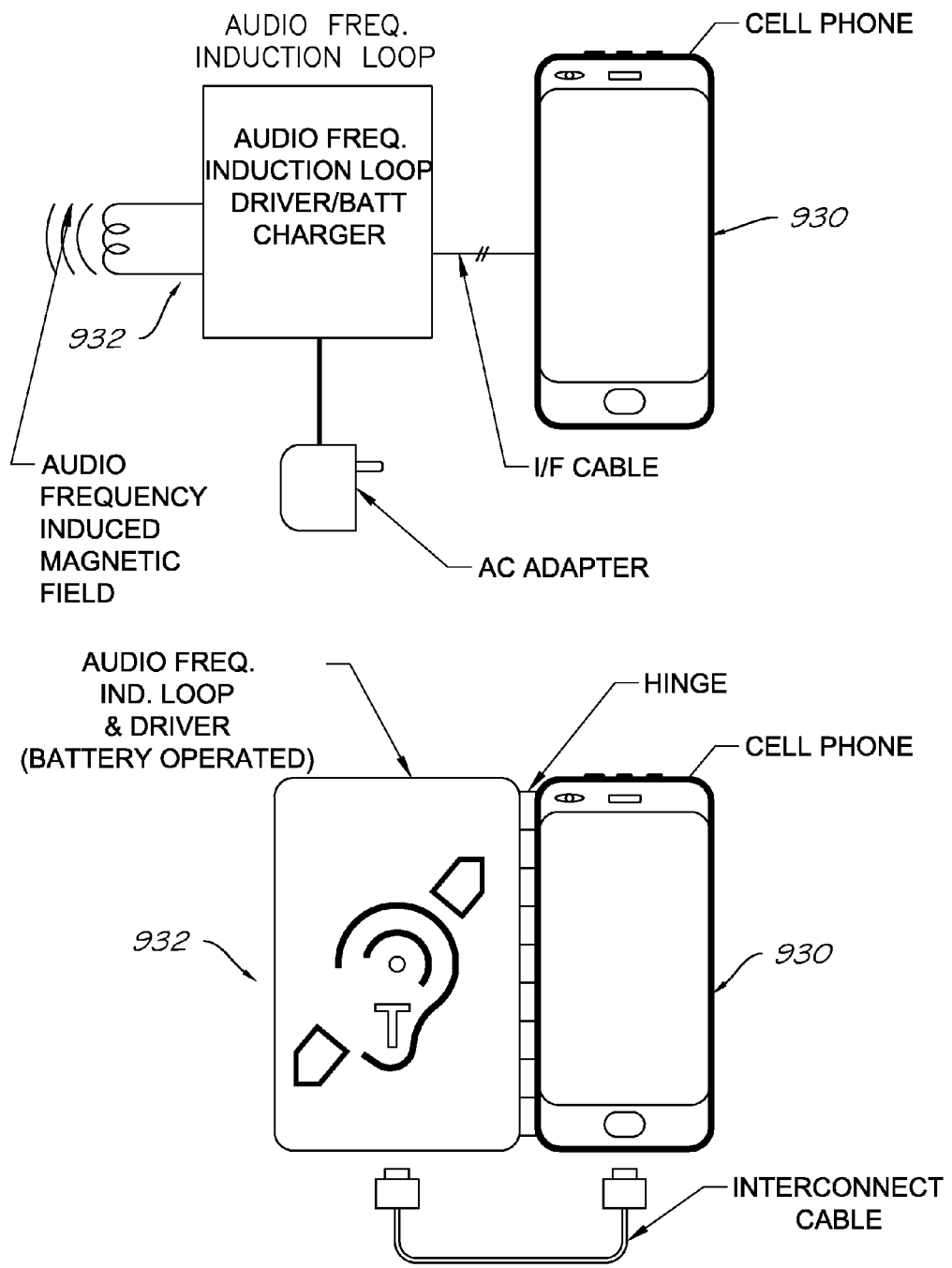
FIG. 9(*a*) is a single line diagram showing a voice communication unit according to another embodiment of the present invention.

The outer audio unit 10 comprises an outer voice sensing device 12 configured for sensing voice at an outer side and generating voice signals for an inner side and an outer voice reproducing device 14 configured for reproducing voice at the outer side from voice signal from the inner side, as shown in FIG. 1.

The inner audio unit 20 comprises an inner voice sensing device 22 configured for sensing voice at the inner side and generating voice signals for the outer side and an inner voice reproducing device 24 configured for reproducing voice at the inner side from voice signal from the outer side, as shown in FIG. 1.

The outer audio frequency modulation loop 30 is configured for activating and delivering the voice signals to an external hearing aid device 910 having an induction sensing device, which may include Telecoil, as shown in FIG. 1. The external hearing aid device 910 may be any type of devices if they have the Telecoil, for an example.

The infrared audio frequency transmitter 40 is configured for activating and delivering the voice signals to an external hearing aid device 920 having an infrared detector, as shown in FIG. 1.

The voice communication unit 100 is configured for providing a full-duplex hands-free communication over the barrier 900 through an adaptive digital filter.

Figure 14:
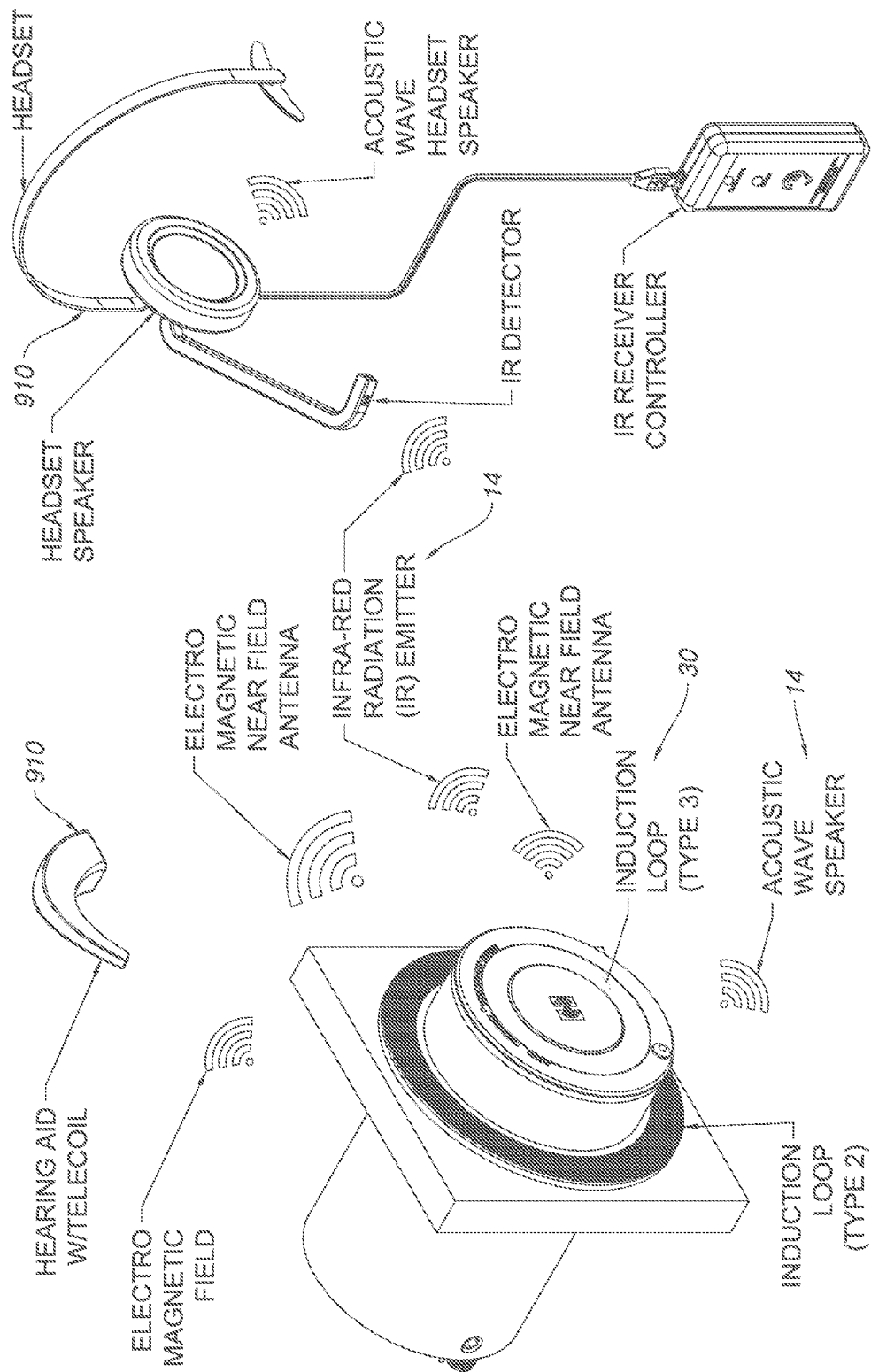
FIG. 14 is a perspective view showing a voice communication unit and external hearing aid devices according to still another embodiment of the present invention.
Figure 15:
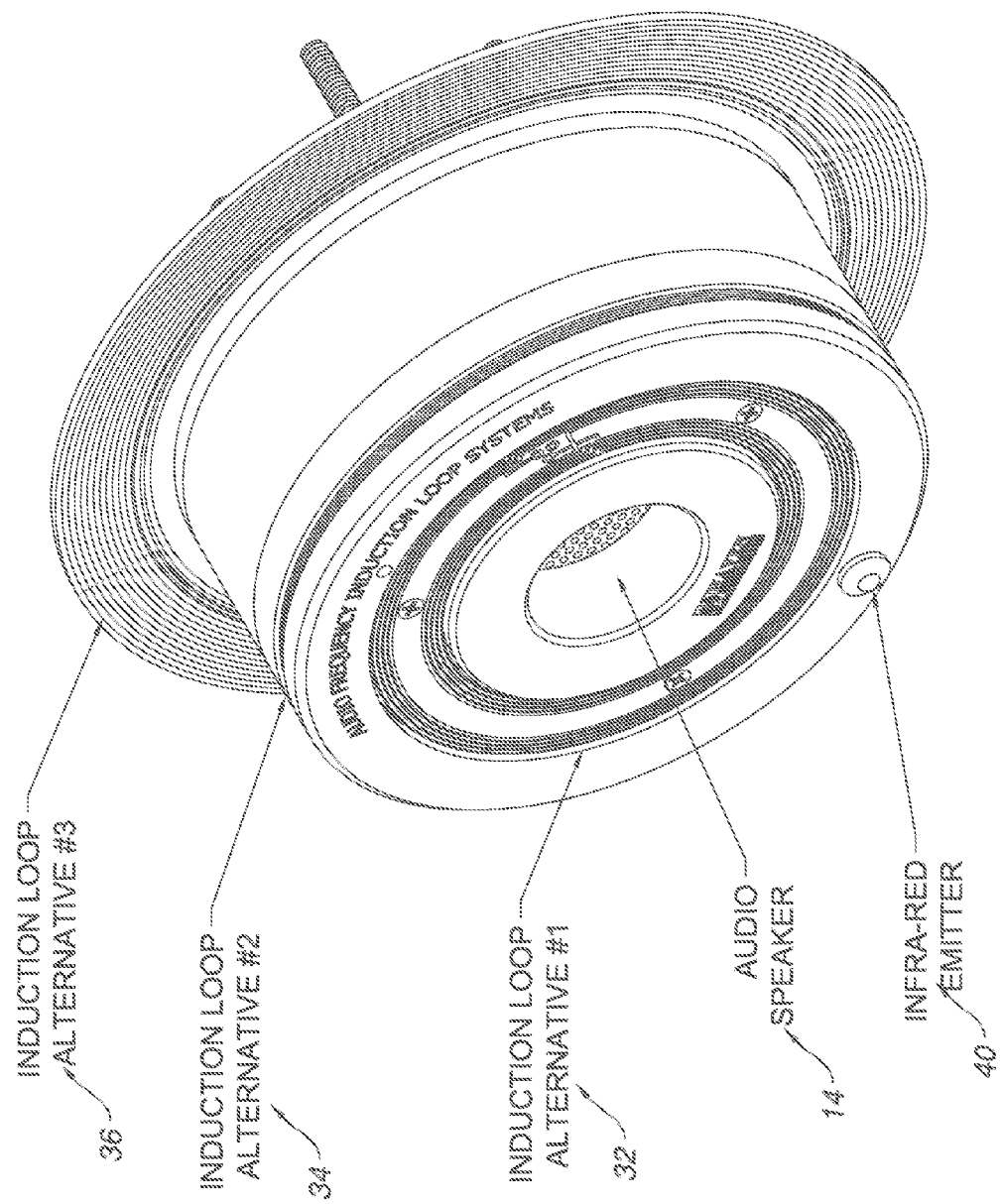
FIG. 15 is a perspective view showing an outer audio unit of a voice communication unit according to another embodiment of the present invention.
Figure 16:
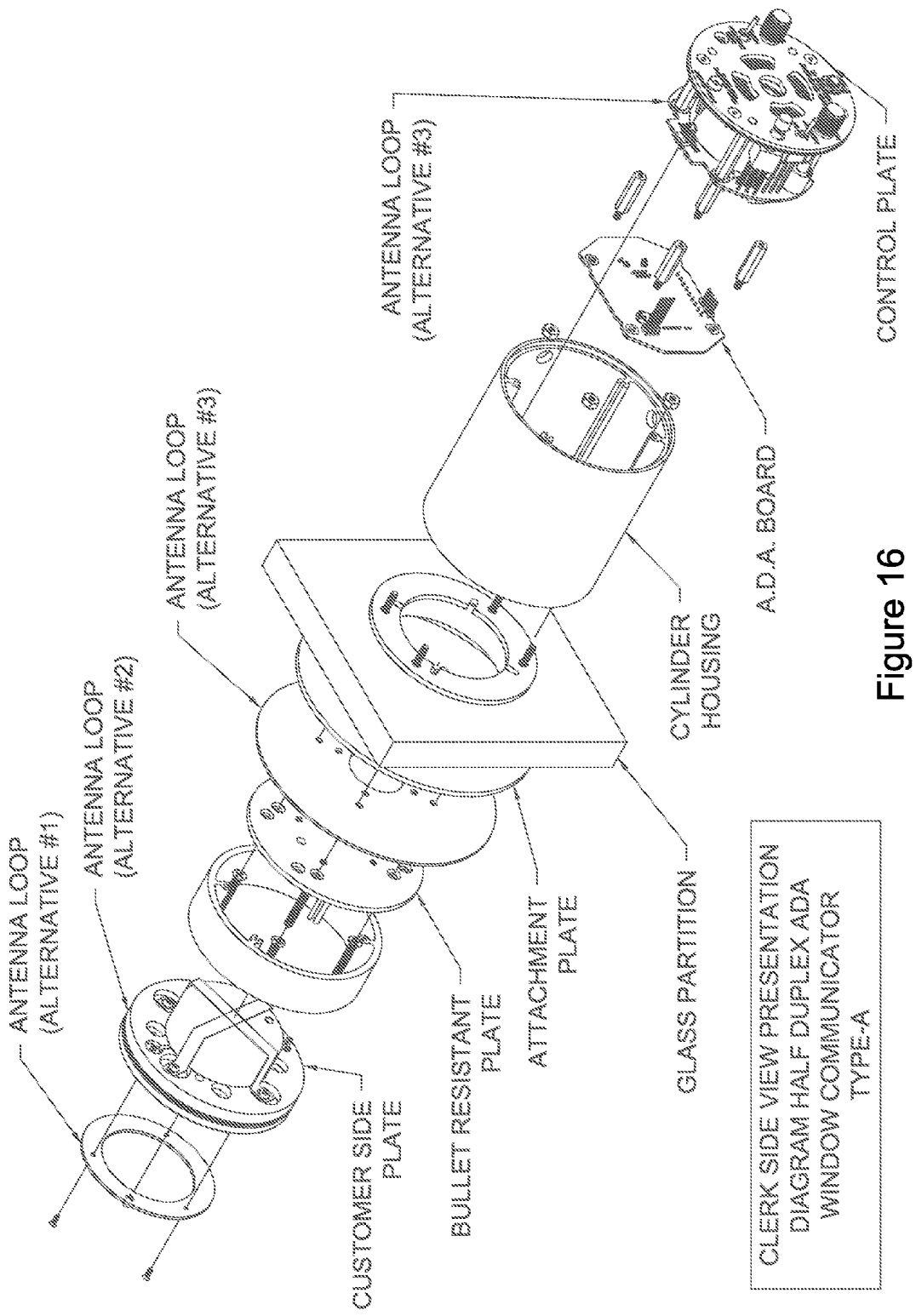
FIG. 16 is an exploded perspective view of an inner audio unit according to another embodiment of the present invention.

In a specific embodiment, the outer audio frequency modulation loop 30 is disposed in a cylindrical housing and comprises a first induction loop 32, a second induction loop 34, a third induction loop 36 as shown especially in FIGS. 14-16.

The first induction loop 32 is provided on a front end portion of the cylindrical housing enclosing the outer voice reproducing device 30 disposed in a central portion of the front end portion of the cylindrical housing, and coils of the first induction loop 32 are wound perpendicularly with respect to an axis of the cylindrical housing as shown in FIG. 15.

The second induction loop 34 is provided around a side circumferential surface portion of the cylindrical housing, and coils of the second induction loop 34 are wound in parallel with respect to an axis of the cylindrical housing.

The third induction loop 36 is provided on a base plate from which the cylindrical housing protrudes, and coils of the third induction loop 36 are wound perpendicularly with respect to an axis of the cylindrical housing.

Each of the first, second, and third induction loops 32, 34, 36 is configured to receive audio signals from the inner voice sensing device 22 and generate audio-frequency-induced electro-magnetic field.

The audio-frequency-induced electro-magnetic field is adapted to be picked up by the external hearing aid device 910 having a Telecoil.

The outer audio frequency modulation loop 30 may further comprise an induction loop driver 38 connected between the first, second, and third induction loops 32, 34, 36 and configured for driving the audio signals from the inner voice sensing device 22 so as to generate the audio-frequency-induced electro-magnetic field.

The diameters of the first, second, and third induction loops 32, 34, 36 may be different from one another.

The infrared audio frequency transmitter 40 may be disposed on the front end portion of the cylindrical housing.

The outer voice reproducing device 14 may be receded inward so as to avoid effects from external weather conditions.

The outer audio frequency modulation loop 30 may be further configured for activating and delivering the voice signals to a mobile communicating device having a wireless communication capability using short-wavelength UHF radio waves, instead of the external hearing aid devices 910, 920, for example.

The mobile communication device may comprise a smart phone. In an embodiment, the mobile communication device may comprise iPhone®. The wireless communication capability using short-wavelength UHF radio waves may comprise Bluetooth®.

At least one of the first induction loop 32, the second induction loop 34, and the third induction loop 36 may be configured for activating and delivering the voice signals to the mobile communicating device.

The voice communication unit may further comprise an interfacing device 38 for providing an interface to a mobile communication device that works as the external hearing aid device 910, 920. The mobile communication device may comprise a cellular phone or a smart phone as shown in FIGS. 9(a) and 9(b).

As shown in FIG. 1, an inner audio frequency modulation loop 32 and an inner infrared audio frequency transmitter 42 may be provided inside, corresponding to the audio frequency modulation loop 30 and the outer infrared audio frequency transmitter 40. And, they are going to be paired with another external hearing aid device 912. The devices provided inside can be used by a clerk inside. The headsets and alarm outputs are further provided and their operation is as well known and detailed description is omitted.

FIG. 2 shows a closeup view of the major components according to an embodiment of the invention. Of course, the distinction between inside and outside may be just nominal. Since any person can be in any side, the hearing aid facilities are needed on both sides of the barrier 900, which is shown partially.

Figure 3:
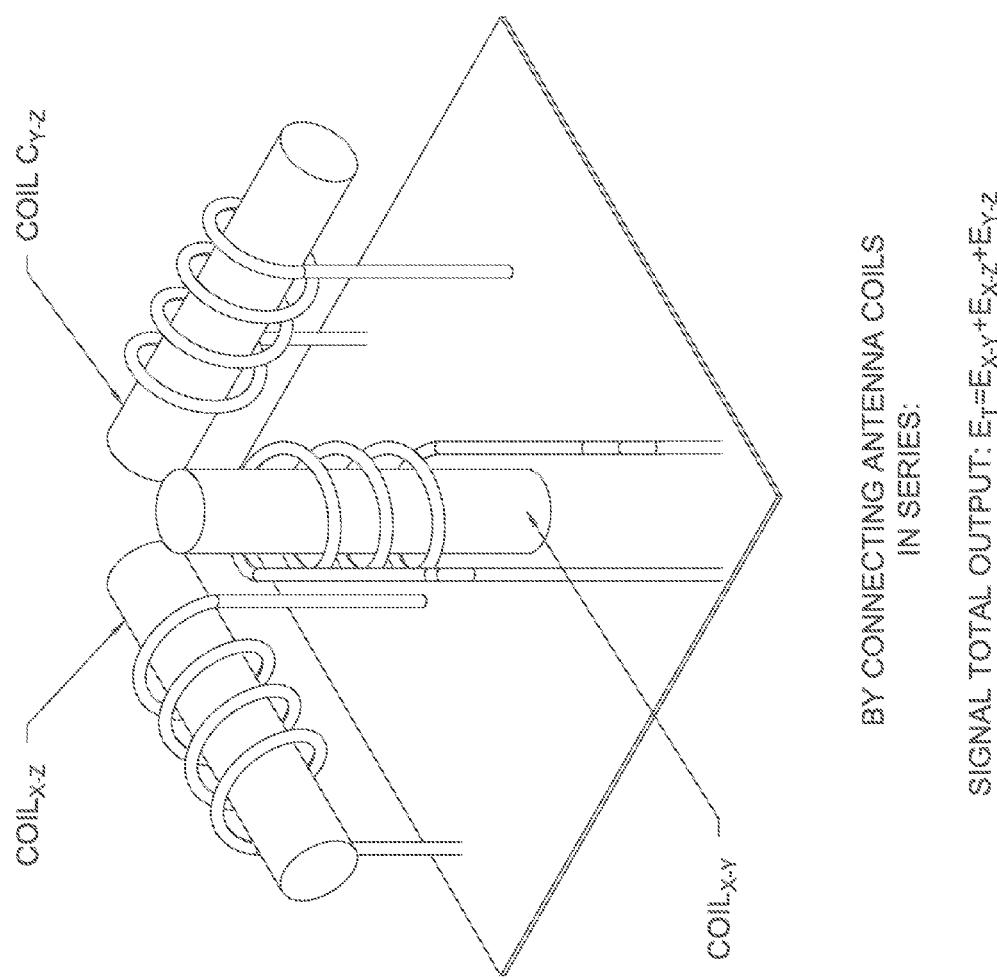
FIG. 3 is a perspective view of a 3D sensor coils for a voice communication unit according to an embodiment of the present invention.

As shown in FIG. 3, in certain embodiments of the invention, the 3D sensor coils for a voice communication unit can be used for antennas in the external hearing aid device 910, 912 according to an embodiment of the present invention. The signals captured by each of the 3D sensor coils are added to the total output.

Figure 4:
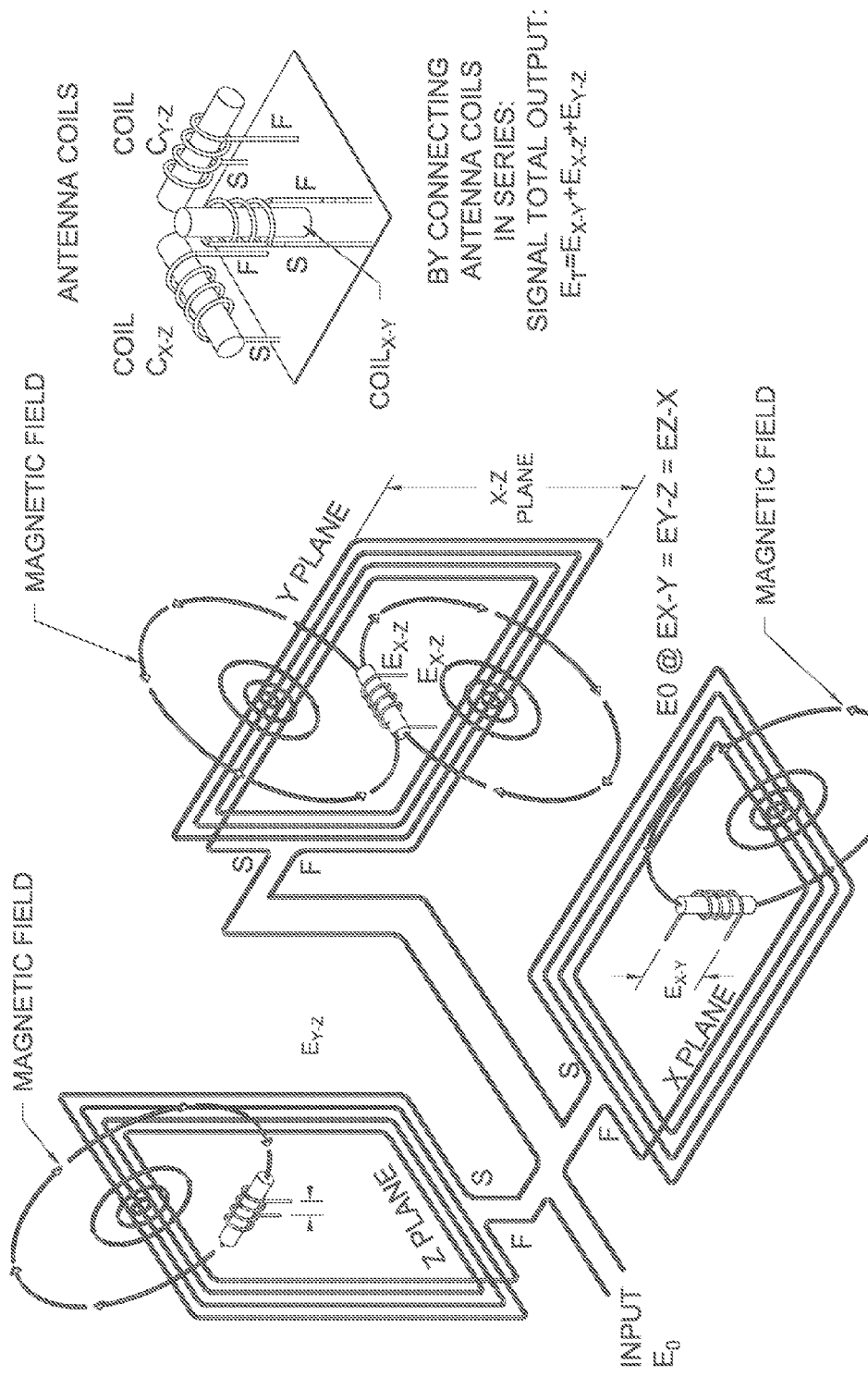
FIG. 4 is a perspective view of three planes induction loops for a voice communication unit according to an embodiment of the present invention.

As shown in FIG. 4, three planes induction loops for a voice communication unit may be used according to an embodiment of the present invention. These three planes induction loops may interact with the 3D sensor coils in FIG. 3.

Figure 5:
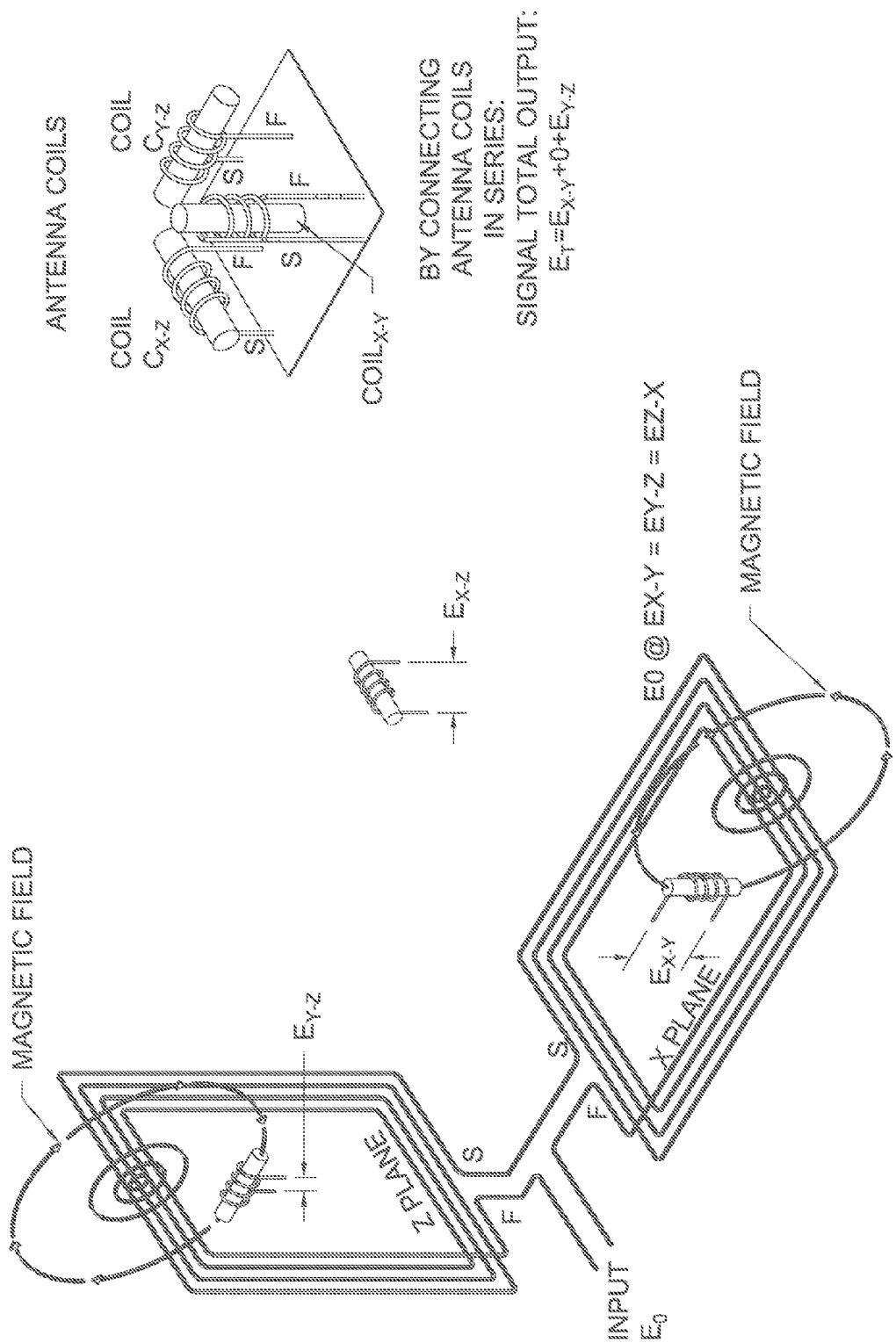
FIG. 5 is a perspective view of two planes induction loops for a voice communication unit according to an embodiment of the present invention.

As shown in FIG. 5, instead of three planes induction loops, two planes induction loops may be used for a voice communication unit according to an embodiment of the present invention. They may interact with the 3D sensor coils in FIG. 3, too.

Figure 6:
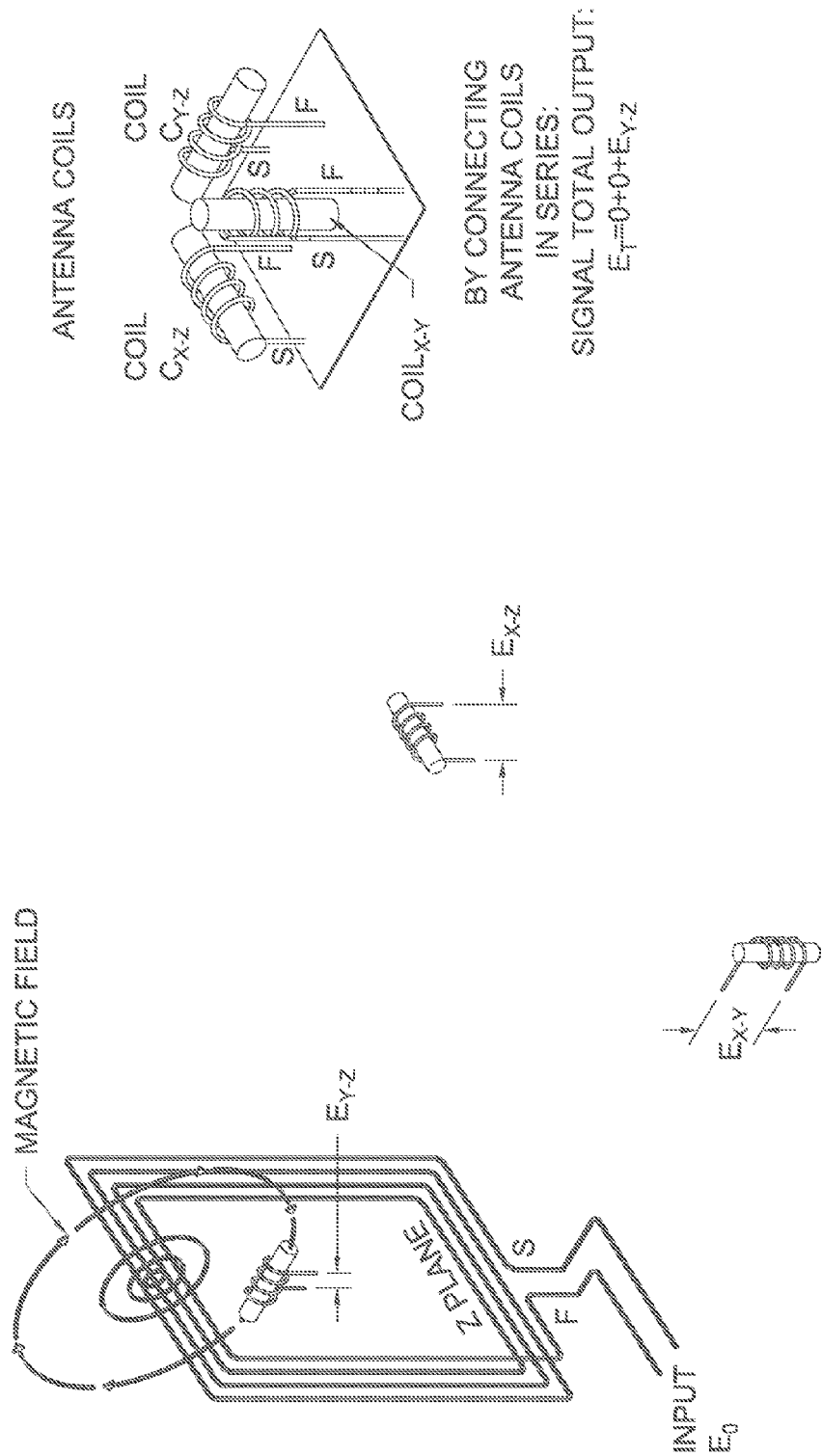
FIG. 6 is a perspective view of one plane induction loop for a voice communication unit according to an embodiment of the present invention.

FIG. 6 is a perspective view of one plane induction loop for a voice communication unit according to an embodiment of the present invention;

FIGS. 7a-1, 7a-2, 7b-1, and 7b-2 are a circuit diagram for a voice communication unit according to an embodiment of the present invention. Of course, the circuit diagram shows lots of details for realizing the voice communicating unit of the invention, but according to certain embodiments of it. Therefore, any of the specific circuit elements must not be interpreted limitingly. As long as performing functions as described in the claims, any types of circuit elements or circuit portions may be used for the invention.

FIGS. 8a-1, 8a-2, 8b-1, and 8b-2 are a circuit diagram for a voice communication unit according to another embodiment of the present invention. As in the above, the circuit diagram shows lots of details for realizing the voice communicating unit of the invention, but according to certain embodiments of it. Therefore, any of the specific circuit elements must not be interpreted limitingly. As long as performing functions as described in the claims, any types of circuit elements or circuit portions may be used for the invention.

FIG. 9(a) is a single line diagram showing a voice communication unit according to another embodiment of the present invention.

FIG. 9(b) shows an interface of a cell phone for a voice communication unit according to another embodiment of the present invention. In addition to the external hearing aid device 910, 920, a cell phone 930 may be used in the communication through an interface 932. The interfacing device 932 may be provided separately as shown in the top, or as a part of an accessory such as a cell-phone case as shown in the bottom.

FIG. 10 is a schematic diagram showing a comparison between a prior art (top) and a voice communication unit according to another embodiment of the present invention (bottom). Again, the schematic diagram is for an example.

Figure 11:
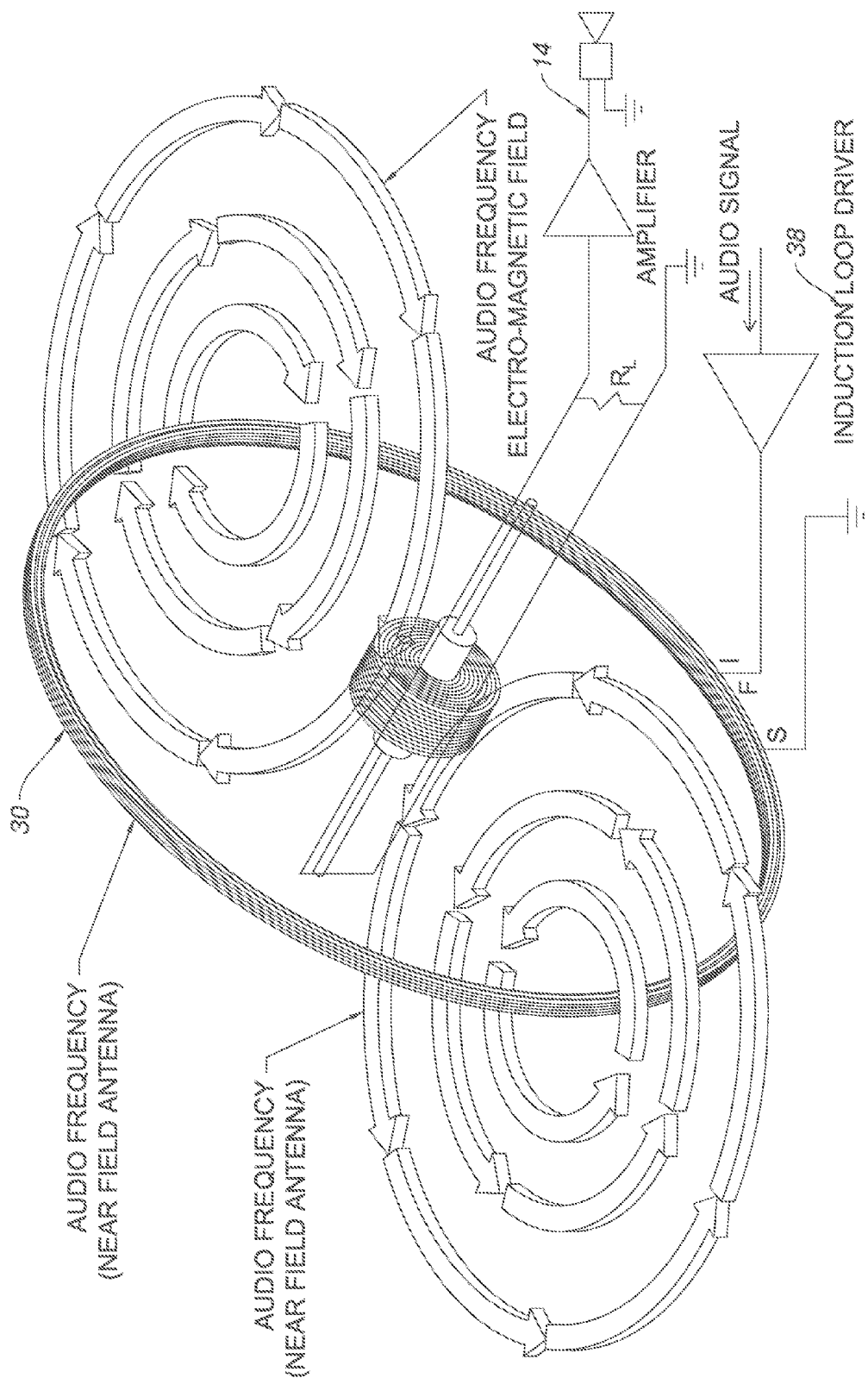
FIG. 11 is a diagram showing operation of an audio frequency induction loop and a pick up coil in a voice communication unit according to another embodiment of the present invention.
Figure 12:
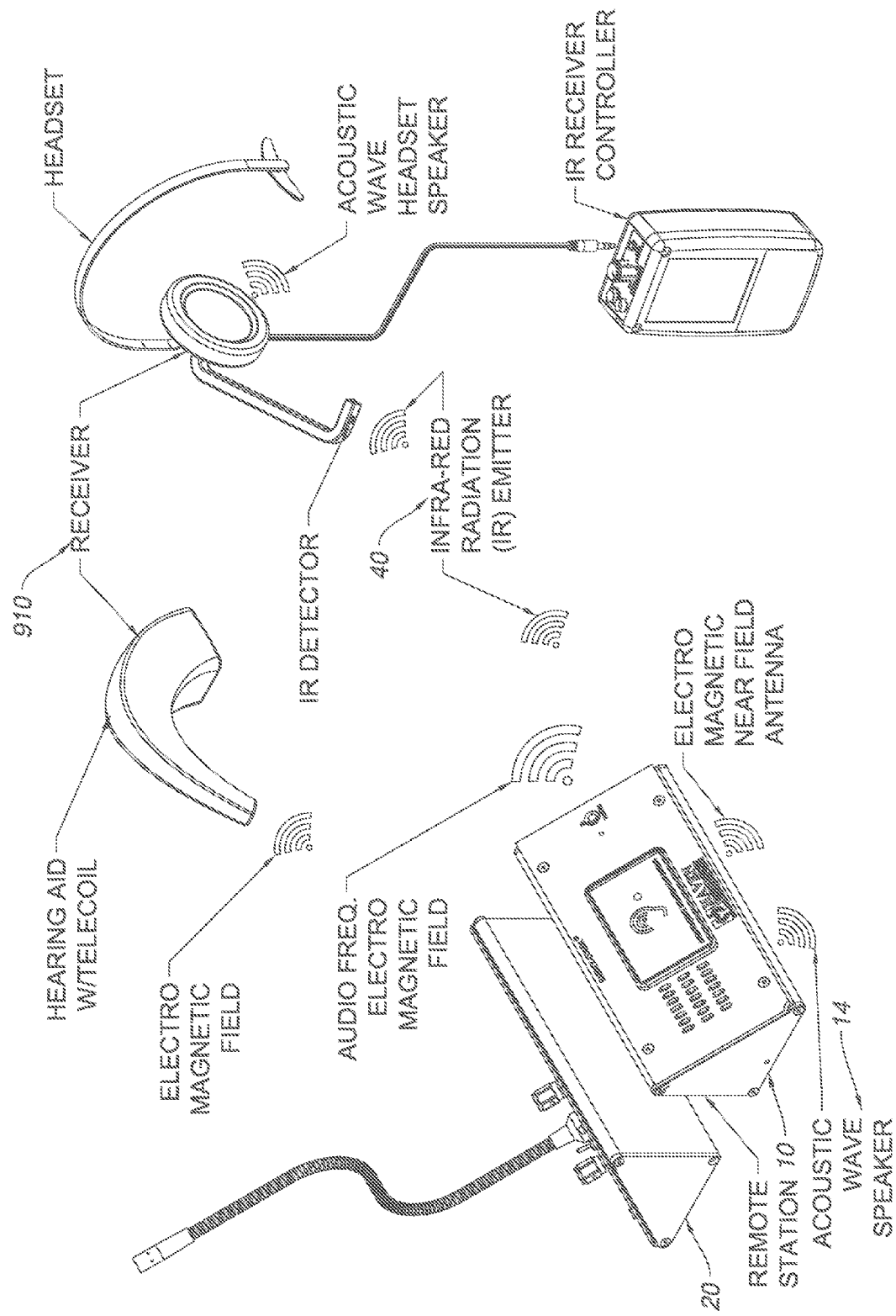
FIG. 12 is a perspective view showing a voice communication unit and external hearing aid devices according to another embodiment of the present invention.
Figure 13:
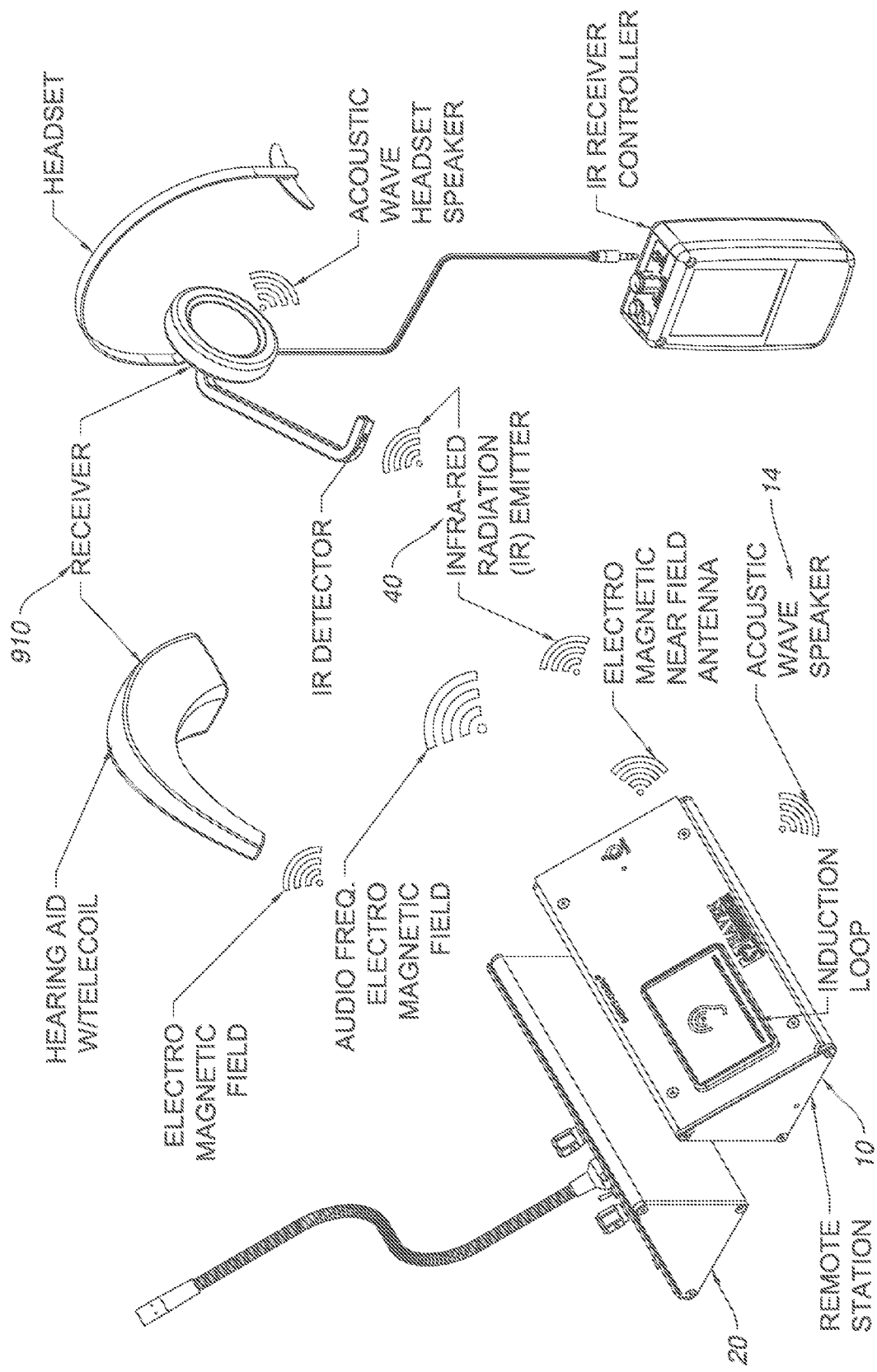
FIG. 13 is a perspective view showing a voice communication unit and external hearing aid devices according to still another embodiment of the present invention.

FIG. 11 shows an operation of an audio frequency induction loop and a pick up coil in a voice communication unit according to another embodiment of the present invention.

FIGS. 12 to 15 show voice communication units and external hearing aid devices according to embodiments of the present invention.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A voice communication unit for communicating through a barrier, the unit comprising:
   an outer audio unit comprising an outer voice sensing device configured for sensing voice at an outer side and generating voice signals for an inner side and an outer voice reproducing device configured for reproducing voice at the outer side from voice signal from the inner side;
   an inner audio unit comprising an inner voice sensing device configured for sensing voice at the inner side and generating voice signals for the outer side and an inner voice reproducing device configured for reproducing voice at the inner side from voice signal from the outer side;
   an outer audio frequency modulation loop configured for activating and delivering the voice signals to an external hearing aid device having an induction sensing device; and
   an infrared audio frequency transmitter configured for activating and delivering the voice signals to an external hearing aid device having an infrared detector,
   wherein the voice communication unit is configured for providing a full-duplex hands-free communication over the barrier through an adaptive digital filter.

2. The voice communication unit of claim 1, wherein the outer audio frequency modulation loop is disposed in a cylindrical housing and comprises:
   a first induction loop provided on a front end portion of the cylindrical housing enclosing the outer voice reproducing device disposed in a central portion of the front end portion of the cylindrical housing, wherein coils of the first induction loop are wound perpendicularly with respect to an axis of the cylindrical housing;
   a second induction loop provided around a side circumferential surface portion of the cylindrical housing, wherein coils of the second induction loop are wound in parallel with respect to an axis of the cylindrical housing; or
   a third induction loop provided on a base plate from which the cylindrical housing protrudes, wherein coils of the third induction loop are wound perpendicularly with respect to an axis of the cylindrical housing,
   wherein each of the first, second, and third induction loops is configured to receive audio signals from the inner voice sensing device and generate audio-frequency-induced electro-magnetic field, and wherein the audio-frequency-induced electro-magnetic field is adapted to be picked up by the external hearing aid device having a Telecoil.

3. The voice communication unit of claim 1, wherein the outer audio frequency modulation loop further comprises an induction loop driver connected between the first, second, and third induction loops and configured for driving the audio signals from the inner voice sensing device so as to generate the audio-frequency-induced electro-magnetic field.

4. The voice communication unit of claim 1, wherein diameters of the first, second, and third induction loops are different from one another.

5. The voice communication unit of claim 1, wherein the infrared audio frequency transmitter is disposed on the front end portion of the cylindrical housing.

6. The voice communication unit of claim 1, wherein the outer voice reproducing device is receded inward so as to avoid effects from external weather conditions.

7. The voice communication unit of claim 6, wherein at least one of the first induction loop, the second induction loop, and the third induction loop is configured for activating and delivering the voice signals to the mobile communicating device.

8. The voice communication unit of claim 1, wherein the outer audio frequency modulation loop is further configured for activating and delivering the voice signals to a mobile communicating device having a wireless communication capability using short-wavelength UHF radio waves.

9. The voice communication unit of claim 8, wherein the mobile communication comprises a smart phone.

10. The voice communication unit of claim 1, wherein the induction sensing device comprises a telecoil.

11. The voice communication unit of claim 1, further comprising an interfacing device for providing an interface to a mobile communication device that works as the external hearing aid device.

12. The voice communication unit of claim 11, wherein the mobile communication device comprises a cellular phone or a smart phone.

* * * * *